United States Patent
Chong et al.

(10) Patent No.: US 11,513,228 B2
(45) Date of Patent: Nov. 29, 2022

(54) LIDAR SENSING ARRANGEMENTS

(71) Applicant: SANTEC CORPORATION, Aichi (JP)

(72) Inventors: Changho Chong, Los Altos, CA (US); Masayuki Okano, Milpitas, CA (US)

(73) Assignee: SANTEC CORPORATION, Komaki (JP)

(*) Notice: Subject to any disclaimer, the term of this patent is extended or adjusted under 35 U.S.C. 154(b) by 400 days.

(21) Appl. No.: 16/810,269

(22) Filed: Mar. 5, 2020

(65) Prior Publication Data

US 2021/0278538 A1    Sep. 9, 2021

(51) Int. Cl.

| | | |
|---|---|---|
| G01S 17/58 | (2006.01) | |
| G01S 7/481 | (2006.01) | |
| G06F 17/14 | (2006.01) | |
| G01S 17/42 | (2006.01) | |
| G01B 9/02003 | (2022.01) | |
| G01S 17/34 | (2020.01) | |

(52) U.S. Cl.
CPC .......... *G01S 17/58* (2013.01); *G01B 9/02003* (2013.01); *G01S 7/4817* (2013.01); *G01S 17/34* (2020.01); *G01S 17/42* (2013.01); *G06F 17/142* (2013.01)

(58) Field of Classification Search
CPC ........ G01S 7/4817; G01S 17/34; G01S 17/42; G01S 17/58; G01B 9/02003; G06F 17/142
See application file for complete search history.

(56) References Cited

U.S. PATENT DOCUMENTS

| | | | |
|---|---|---|---|
| 8,427,649 B2 | 4/2013 | Hays | |
| 9,295,391 B1 | 3/2016 | Tearney et al. | |
| 9,851,433 B2 | 12/2017 | Sebastian | |
| 10,838,047 B2* | 11/2020 | Chong | ................... G01S 17/34 |
| 11,067,671 B2* | 7/2021 | Chong | ................... G01S 7/4814 |
| 11,067,816 B1 | 7/2021 | Ghosh | |
| 11,391,841 B2 | 7/2022 | Bondy et al. | |
| 2003/0020903 A1 | 1/2003 | Healy et al. | |

(Continued)

FOREIGN PATENT DOCUMENTS

| | | |
|---|---|---|
| JP | 2016-502665 A | 1/2016 |
| JP | 2017-502315 A | 1/2017 |

(Continued)

OTHER PUBLICATIONS

Aflatouni, et al., "Nanophotonic coherent imager," Optics Express 5118, vol. 23, No. 4, Feb. 23, 2015, DOI:10.1364/OE.23.005117 (9 pages).

(Continued)

*Primary Examiner* — Michael A Lyons
(74) *Attorney, Agent, or Firm* — Foley & Lardner LLP

(57) ABSTRACT

System and methods for Light Detecting and Ranging (LIDAR) are disclosed. The LIDAR system includes a light source that is configured project a beam at various wavelengths toward a wavelength dispersive element. The wavelength dispersive element is configured to receive the beam and direct at least a portion of the beam into a field of view (FOV) at an angle dependent on frequency. The system also includes a detector that is positioned to receive portions of the beam reflected from an object within the FOV and a processor that is configured to control the light source and determine a velocity of the object.

18 Claims, 16 Drawing Sheets

(56) References Cited

U.S. PATENT DOCUMENTS

| | | |
|---|---|---|
| 2003/0080899 A1 | 5/2003 | Lee et al. |
| 2003/0089778 A1 | 5/2003 | Tsikos et al. |
| 2003/0210389 A1 | 11/2003 | Matsumoto et al. |
| 2004/0036886 A1 | 2/2004 | Motamedi et al. |
| 2005/0030544 A1 | 2/2005 | Vanwiggeren et al. |
| 2005/0088661 A1 | 4/2005 | Froggatt |
| 2006/0114471 A1 | 6/2006 | Cyr |
| 2007/0171367 A1 | 7/2007 | Sebastian et al. |
| 2007/0233396 A1 | 10/2007 | Tearney et al. |
| 2008/0063028 A1 | 3/2008 | Lekkas et al. |
| 2009/0103100 A1 | 4/2009 | Froggatt et al. |
| 2011/0080561 A1 | 4/2011 | Hayashi et al. |
| 2011/0205523 A1 | 8/2011 | Rezk et al. |
| 2011/0273719 A1 | 11/2011 | Froggatt |
| 2015/0177380 A1 | 6/2015 | Satyan et al. |
| 2016/0259038 A1 | 9/2016 | Retterath et al. |
| 2016/0266005 A1 | 9/2016 | Bos |
| 2016/0343169 A1 | 11/2016 | Mullins et al. |
| 2016/0356881 A1 | 12/2016 | Retterath et al. |
| 2017/0009031 A1 | 1/2017 | Inokuchi et al. |
| 2017/0090031 A1 | 3/2017 | Bondy et al. |
| 2018/0088236 A1 | 3/2018 | Eichenholz et al. |
| 2018/0172920 A1 | 6/2018 | Froggatt et al. |
| 2018/0238675 A1 | 8/2018 | Wan |
| 2019/0257927 A1 | 8/2019 | Yao |
| 2019/0317194 A1* | 10/2019 | Chong .................. G01S 7/4814 |
| 2019/0317199 A1* | 10/2019 | Chong .................. G01S 7/4817 |
| 2020/0072941 A1 | 3/2020 | Jansen et al. |
| 2020/0371239 A1 | 11/2020 | Rumala |
| 2021/0157000 A1* | 5/2021 | Imaki ...................... G01S 17/58 |
| 2021/0247497 A1 | 8/2021 | Li et al. |
| 2021/0356359 A1 | 11/2021 | Cyr et al. |
| 2021/0405194 A1 | 12/2021 | Tsuchida |

FOREIGN PATENT DOCUMENTS

| | | |
|---|---|---|
| WO | WO-2015/087564 A1 | 6/2015 |
| WO | WO-2017/054036 A1 | 4/2017 |
| WO | WO-2017/176901 A1 | 10/2017 |
| WO | WO-2019/204301 A1 | 10/2019 |

OTHER PUBLICATIONS

Final Office Action in U.S. Appl. No. 16/278,582 dated Feb. 14, 2020.

Hulme, et al., "Fully integrated hybrid silicon free-space beam steering source with 32 channel phased array," Proc. of SPIE vol. 8989 898907-1, 2014(15 pages).

International Search Report and Written Opinion in International Patent Application No. PCT/US2019/027671 dated Jul. 1, 2019.

Non-Final Office Action in U.S. Appl. No. 16/278,582 dated Sep. 24, 2019.

Pierrottet, D. et al., "Linear FMCW Laser Radar for Precision Range and Vector Velocity Measurements," MRS Proceedings, 1076-K04-06; doi:10.1557/PROC-1076-K04-06 (9 pages).

Poulton, et al., "Coherent solid-state LIDAR with silicon photonic optical phased arrays," vol. 42, No. 20, Oct. 15, 2017, Optics Letters 4091 (6 pages).

White et al., "In Vivo Dynamic Human Retinal Blood Flow Imaging Using Ultra-High-Speed Spectral Domain Optical Doppler Tomography," Optics Express, Dec. 15, 2003, vol. 11, No. 25, pp. 3490-3497.

Zhao, Y. et al., "Doppler Standard Deviation Imaging for Clinical Monitoring of In Vivo Human Skin Blood Flow," Optics Letters, Sep. 15, 200, vol. 25, No. 18, pp. 1358-1360.

International Search Report and Written Opinion for International Application No. PCT/US2021/019341 dated May 3, 2021, 10 pages.

Chan T. [et al.]: 2-Dimensional beamsteering using dispersive deflectors and wavelength tuning. In: Optics Express, vol. 16, No. 19, 2008, S. 14617-14628.

Koyama F. [et al.]: Beam Steering, Beam Shaping, and Intensity Modulation Based on VCSEL Photonics, in IEEE Journal of Selected Topics in Quantum Electronics, vol. 19, No. 4, Jul.-Aug. 2013, S. 1701510-1701510, DOI: 10.1109/JSTQE.2013.2247980.

Office Action for German Application No. 112019002028.5 dated Feb. 1, 2022, 8 pages.

Sandborn P.: FMCW Lidar: Scaling to the Chip-Level and Improving Phase-Noise-Limited Performance. University of California, Berkeley, 2017.

International Search Report on PCT/US2022/014505 dated May 11, 2022 (11 pages).

\* cited by examiner

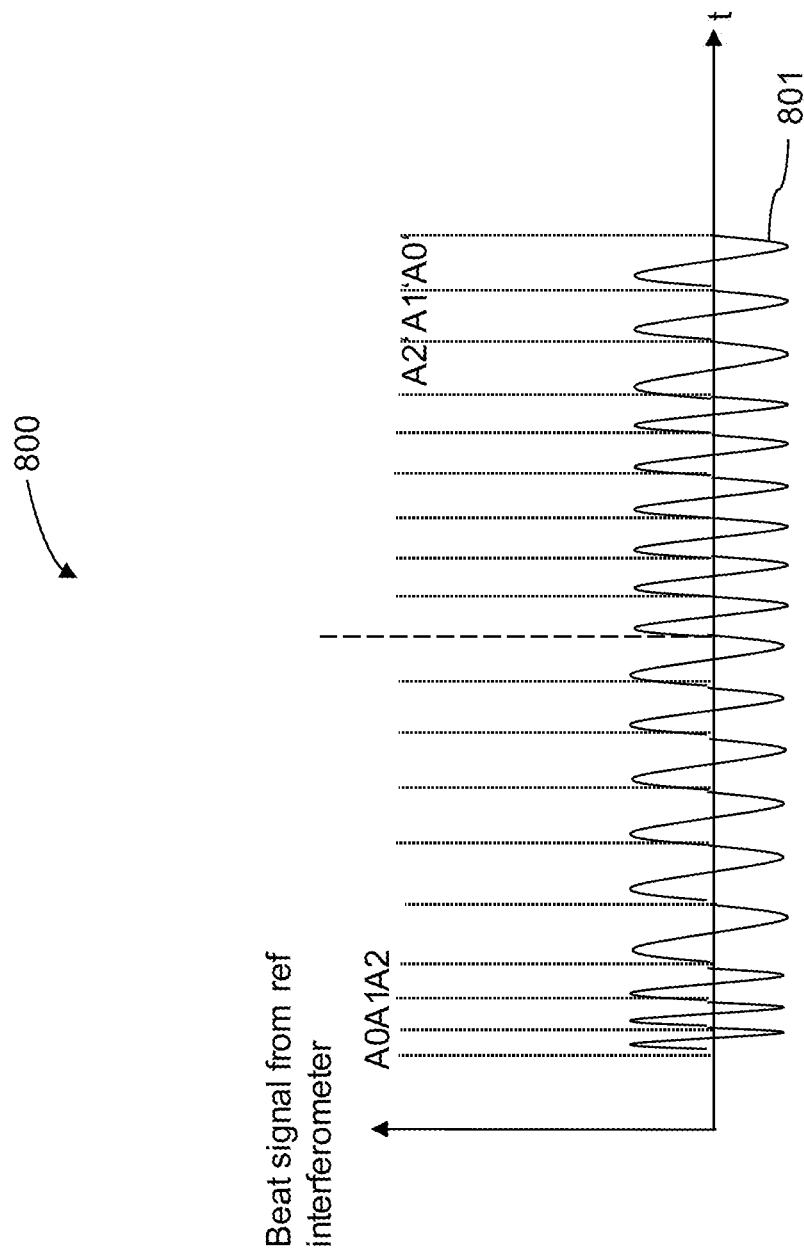

LIDAR SENSING ARRANGEMENTS

TECHNICAL FIELD

The present application relates generally to the field of sensing and, more specifically, to Light Detection and Ranging (LIDAR) sensing arrangements.

BACKGROUND

LIDAR systems use light for detecting a distance between a light source and a target. A beam (e.g., a laser) is directed toward the target. LIDAR systems typically identify the time it takes for light to reach the target, be deflected off the target, and return to a detector. Based on this time and the speed of light, a distance to the target is determined. Detection of targets and determinations of movement of the targets are functions that are required to be performed in a reliable, continuous, and timely manner in order for a machine (i.e., an autonomous vehicle) to operate safely.

SUMMARY

The present technology provides systems and methods for LIDAR that are capable of capturing, tracking, and determining velocity of an object within a field of view (FOV). In one implementation, a LIDAR system includes a light source configured to generate a beam having discrete frequencies at different times, a wavelength dispersive element positioned to receive at least a portion of the beam and configured to sweep the beam over a range of angles in a field of view (FOV), where each discrete frequency of the beam corresponds to a different angle in the FOV, a detector positioned to receive portions of the beam that are reflected from an object within the FOV, and a processor communicably coupled to the detector. The processor is configured to cause the light source to generate a beam that sweeps from a first frequency at a first time to a second frequency over a ramp up time period and from the second frequency back to the first frequency over a ramp down time period, and determine a velocity of the object based on the beam.

In some embodiments, to determine the velocity of the object, the processor is further configured to identify a first portion of the object signal that corresponds to the object detected during the ramp up time period, and identify a second portion of the object signal that corresponds to the object detected during the ramp down time period. In some embodiments, to determine the velocity of the object, the processor is further configured to calculate a first beat frequency for the first portion of the object signal and calculate a second beat frequency for the second portion of the object signal. In some embodiments, the first beat frequency is calculated using the first portion of the object signal and a first portion of the generated beam that corresponds to the first object signal, and the second beat frequency is calculated using the second portion of the object signal and a second portion of the generated beam corresponding to the second object signal. In some embodiments, the processor is further configured to determine a distance of the object from the LIDAR system using the first beat frequency and the second beat frequency. In some embodiments, the system further includes, an interferometer, and a beam splitting device positioned between the light source and the wavelength dispersive element, the beam splitting device configured to receive the beam generated by the light source and split the beam into an object beam that is directed toward the wavelength dispersive element and a reference beam that is directed toward the interferometer, where the interferometer is configured to detect frequencies of the reference beam.

In some embodiments, the ramp up time period and the ramp down time period correspond to a first frame, wherein the processor is further configured to cause the beam to sweep from the first frequency at a second time to the second frequency over a second ramp up time period and cause the beam to sweep from the second frequency back to the first frequency over a second ramp down time period, and wherein the second time, the second ramp up time period, and the second ramp down time period correspond to a second frame. In some embodiments, the processor is further configured to determine a first distance and a first angle of the object relative to LIDAR system during the first frame, determine a second distance and a second angle of the object relative to the LIDAR system during the second frame, and determine a velocity vector of the object relative to the LIDAR system using the first distance, the second distance, the first angle, and the second angle. In some embodiments, to determine the second distance of the object, the processor is further configured to predict the second distance of the object relative to the LIDAR system using the first distance and the velocity of the object generate a filter based on the predicted second distance and filter received signals from the object in the second frame using the filter. In some embodiments, the processor is further configured to determine a velocity vector of the object relative to an environment external to the LIDAR system using the velocity vector of the object relative to the LIDAR system and a velocity vector of the LIDAR system relative to the environment external to the LIDAR system.

In another implementation, a system includes a light source configured to generate a beam having discrete frequencies at different times, a wavelength dispersive element positioned to receive at least a portion of the beam and configured to sweep the beam over a range of angles in a field of view (FOV), where each discrete frequency of the beam corresponds to a different angle in the FOV, a detector positioned to receive portions of the beam that are reflected from an object within the FOV, a processor communicably coupled to the detector. The processor is configured to cause the light source to generate a beam that sweeps from a first frequency at a first time to a second frequency over a time period, and determine a velocity of the object based on the portions of the beam received by the detector.

In some embodiments, to determine the velocity, the processor is further configured to determine a phase of a first portion of an object signal, the object signal based on the portions of the beam received by the detector and determine a phase of a second portion of the object signal. In some embodiments, the phase of the first portion is determined by performing a fast Fourier transform (FFT) on the first portion of the object signal and the phase of the second portion is determined by performing a FFT on the second portion of the object signal. In some embodiments, the processor is further configured to determine a distance of the object from system, wherein the distance is determined based on the amplitude of the FFT of the first portion of the object signal and the amplitude of the FFT of the second portion of the object signal. In some embodiments, to determine the velocity, the processor is further configured to determine a time difference between the first portion and the second portion, estimate a wavelength of the beam, and determine the velocity using the phase of the first portion, the phase of the second portion, the time difference, and the wavelength.

In some embodiments, the time period corresponds to a first frame, and wherein the processor is further configured to cause the beam to sweep from the first frequency at a second time to the second frequency continuously over a second time period, wherein the second time period corresponds to a second frame. In some embodiments, to determine the velocity, the processor is further configured to determine a phase of a first object signal that corresponds to the object in the first frame, determine a phase of a second object signal that corresponds to the object in the second frame, and determine the velocity using the phase of the first portion, the phase of the second portion, and a wavelength corresponding to the first object signal.

In another implementation, a method includes controlling, via a processor, a light source to project a beam that is swept continuously from a first frequency to a last frequency starting at a first time over a first time period, the beam being projected towards a wavelength dispersive element configured to project the beam into a FOV at angles depending on frequency and further configured to direct portions of the beam reflected from an object in the FOV to a detector, the detector configured to generate an object signal, and determining, via the processor, a velocity of the object based on the object signal.

In some embodiments, the velocity of the object is determined using a phase of a first portion of the object signal and a phase of a second phase of the object signal. In some embodiments, the method further includes controlling, via the processor, the light source to sweep continuously the beam from the last frequency back to the first frequency after the first time period over a second time period, where determining the velocity of the object is based on an object signal corresponding to the object detected during the first time period and an object signal corresponding to the object detected during the second time period. In some embodiments, the method further includes controlling, via the processor, the light source to project a beam that is swept continuously from the first frequency to the last frequency at a second time during a second time period, wherein the second time is after the first time period, where determining the velocity of the object is based on an object signal corresponding to the object detected during the first time period and an object signal corresponding to the object detected during the second time period.

The foregoing summary is illustrative only and is not intended to be in any way limiting. In addition to the illustrative aspects and features described above, further aspects and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 8a depicts a beat signal profile of a beat signal corresponding to the signal profile of FIG. 7a in accordance with an illustrative embodiment.

DETAILED DESCRIPTION

Figure 1:
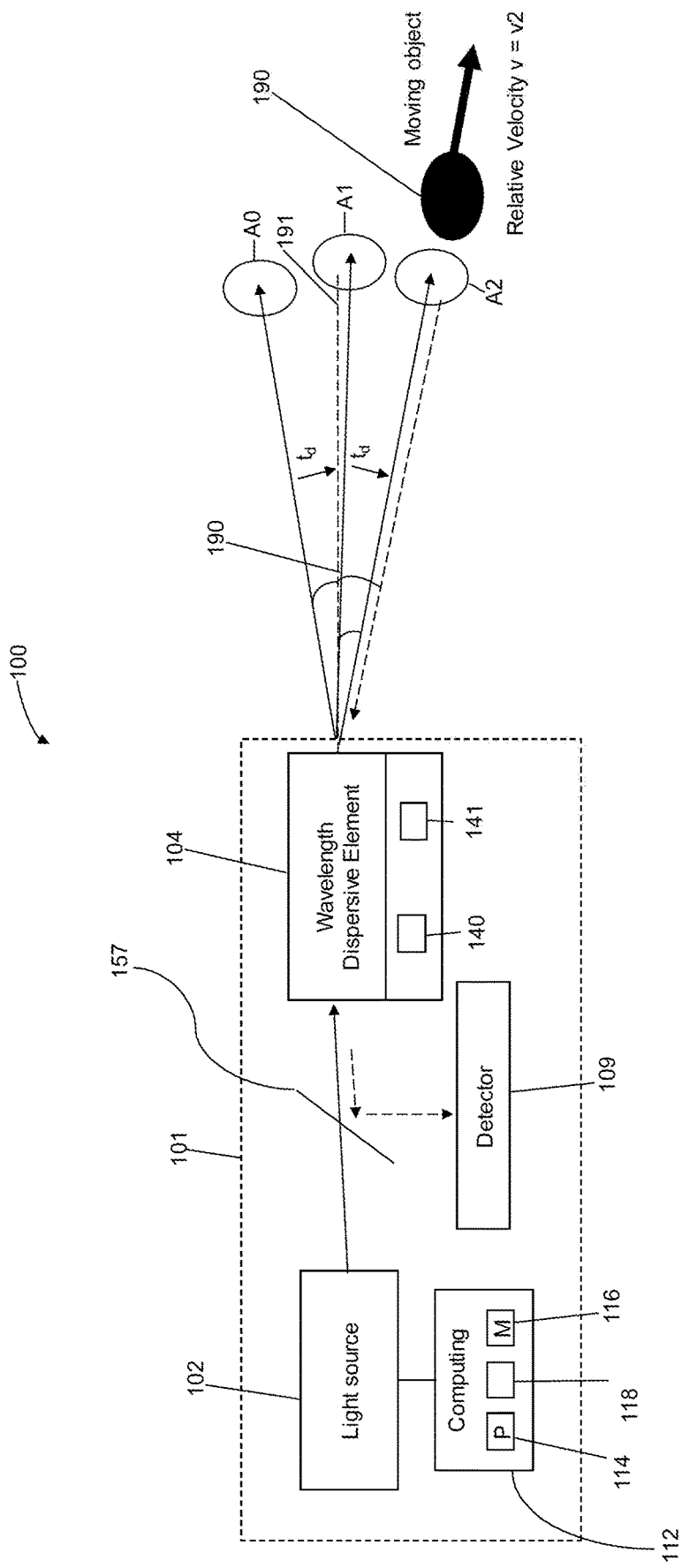
FIG. 1 depicts a block diagram of a LIDAR system in accordance with an illustrative embodiment.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Described herein are systems and methods for LIDAR sensing. As will be discussed in further detail below, disclosed herein is a LIDAR sensing system that includes a light source that is controlled to project a beam (e.g., infrared beam, beam, collimated beam, etc.) at various wavelengths. The beam is directed toward a wavelength dispersive element. The beam is projected from one or more wavelength dispersive elements at an angle that corresponds to the wavelength of the beam. As a result of changing wavelengths of the beam, the LIDAR sensing system generates a vertical scan (e.g., a two-dimensional scan) of a field of view (FOV) of the external environment. A beam steering device may be used to allow the LIDAR sensing system to create multiple vertical scans along a horizontal axis (or vice versa) to create a three-dimensional scan of a field of view (FOV) of the LIDAR sensing system. In some embodiments, the three-dimensional scan of the FOV is accomplished with only static elements (e.g., the first and second elements of the wavelength dispersive elements are both static elements). The received portions of the beam from the scan may then be processed to calculate a velocity of objects within the FOV. One or more scans of the FOV may be repeated multiple times (e.g., to generate multiple frames) in order to allow the LIDAR system to track objects over time, calculate an absolute velocity vector of objects, or otherwise monitor the range, velocity, and position of objects relative to the LIDAR system. The ability for the LIDAR system to measure velocity of an object within a short frame of time allows the LIDAR system to predict future locations of objects relative to the LIDAR system, which allows for the LIDAR system to be used in applications that require enhanced monitoring and tracking of objects within a FOV of the LIDAR system (e.g., an autonomous vehicle). Accordingly, the LIDAR system is able to determine the velocity of an object within a FOV in a very short time taking into consideration the Doppler effect or phase changes in the signals, which reduces the chances that the LIDAR system will mistake a first object detected during a first measurement with a second object detected during a second measurement. As a result the LIDAR system can be implemented in applications where objects must be tracked with precision (e.g., an autonomous vehicle).

Referring to FIG. 1, a block diagram of a LIDAR sensing system 100 is shown. The LIDAR sensing system 100 is shown to include a LIDAR system 101 and a field of view (FOV) 190 of the LIDAR system 101. In some embodiments, an object 190 may be within the FOV 190. In some embodiments, one or more objects 191 each having a unique range and velocity relative to the LIDAR system 101 may be in the FOV 190.

The LIDAR system 101 includes a light source 102. In some implementations, the light source 102 outputs a beam. In some embodiments, the beam (e.g., a laser beam) has a selectable, discrete frequency. Additionally, the light source 102 is configured to adjust a wavelength $\lambda$ (e.g., and thereby frequency) of the beam. That is, in some embodiments, the light source 102 may be a tunable laser where the wavelength $\lambda$ of the laser is tuned or selected. The light source 102 may be configured to adjust the wavelength $\lambda$ of the beam across a range. In some examples, the range of wavelengths $\lambda$ may be between 1.25 µm and 1.35 µm. The light source 102 may be swept across the range of wavelengths $\lambda$, as will be discussed in greater detail below. In some embodiments, the light source 102 may be swept continuously across the range of wavelengths from a first wavelength (and thereby a first frequency) to a last wavelength (and thereby a last frequency). The light source 102 may be swept continuously from the first wavelength to the last wavelength in a linear or non-linear pattern. In some embodiments, the light source 102 may include one or more tunable lasers that are cascaded together in order for the light source 102 to have a greater range of wavelengths $\lambda$.

In FIG. 1, the LIDAR system 101 is also shown to include a wavelength dispersive element 104, a detector 109, and a computing system 114. The wavelength dispersive element 104 is configured to direct light from the light source 102 throughout the FOV 190 and received scattered or reflected portions of the light back to a detector 109. That is, the light source 102 is arranged to project components of a beam to the wavelength dispersive element 104. The wavelength dispersive element 104 receives the beam and directs portions of the beam into the FOV 190. The portions of the beam reflect from objects 191 in the FOV 190 and at least a portion of the reflected beam is received back at wavelength dispersive element 104. The wavelength dispersive element 104 receives the portion of the reflected beam and directs the portion of the reflected beam toward a detector 109. The detector 109 receives the portions of the reflected beams and generates an electrical signal that is indicative of the received portions of the reflected light and thereby indicative of the object. The electrical signal may be transmitted to a processor 114 of the computing system 112 that may process the electrical signal (e.g., an object signal) in order to determine a range and velocity of the object 191 in the FOV 190.

In some embodiments, the wavelength dispersive element 104 may include a first element 140 configured to direct or control at least a portion of a beam from the light source 102 along angles of a first axis 191 of the FOV 190. In some embodiments, the first element 140 directs portions of the beam along various angles relative to the first axis 191 of the FOV 190 based on the wavelength of each respective portion of the beam. In some embodiments, the first element 140 may include one or more diffraction gratings, prisms, crystals, or other dispersive optical elements. In some embodiments, one or more diffraction gratings may be configured to receive portions of the beam from the light source 102 at a constant incident angle and reflect the portions of the beam into the FOV 190 at diffraction angles that are dependent on the wavelength $\lambda$ of the portion of the beam. The portions of the beam directed into the environment may then be reflected from objects 191 within the FOV 190 and the reflected portions of the beam may be received at the diffraction grating and directed toward the detector 109. In this way, in some embodiments, the first element 140 may be configured to disperse a light beam along the first axis of the FOV 190 based on the characteristics (e.g., wavelengths) of the light beams.

In some embodiments, the wavelength dispersive element 104 may also include a second element 141. In some embodiments, the second element 141 configured to direct at least a portion of a beam the light source 102 along a second axis (e.g., a horizontal axis) of the FOV 190. In some embodiments, the second element 141 may include a beam steering device (e.g., a rotating mirror, or actuator of the first element). In some embodiments, the beam steering device 102 may be configured to control, rotate, or adjust the first element (e.g., a diffraction grating) such that the first element 140 can be used to generate multiple scans (e.g., each scan along the first axis) along the second axis in order to generate a three dimensional scan of the FOV 190. In some embodiments, the second element 140 may include a 1 by N (1×N) splitter that splits the beam from the light source 102 into N portions and directs each of the N portions to a respective dispersion element (e.g., the first element 140) at each output of the 1×N splitter. That is, each of the dispersion elements may create a scan by directing portions of the beam along the first axis and the second element 141 (e.g., the 1×N splitter) allows the scans of each dispersion element to be spread out throughout the second axis. In this way, in an implementation, a three dimensional scan may be made of the external environment of the LIDAR system 101 using only static elements in the LIDAR system.

The detector 109 is configured to and positioned within the system to receive portions of light reflected from objects within the FOV 190. In some embodiments, the detector 109 may be communicably coupled to the computing system 112 (e.g., processor 114). In some embodiments, the detector 109 includes an infrared sensor, a camera, an infrared camera, or any other light detecting device that can sense the frequency of received light. The detector 109 is positioned such that light received at the wavelength dispersive element 104 (e.g., light reflected from the object 190) can be directed to the detector 109. For example, in some embodiments, the LIDAR system 101 may include a beam splitting device 157 that is positioned between the light source 102 and the wavelength dispersive element 104 such that the beam from the light source 102 traverses the beam splitting device 157 and is directed to the wavelength dispersive element 104. In some embodiments, the beam splitting device 157 may include a half-mirror, reciprocal mirror, half-silvered mirror, or other optical element configured to direct light from the light source 102 toward the wavelength dispersive element 104 and direct light from the wavelength dispersive element 104 toward the detector 109. The beam splitting device 157 may also be positioned such that light reflected from object 190 (and directed by the wavelength dispersive element 104) is reflected, diffracted, or otherwise directed by the beam splitting device 157 to the detector 109. In some embodiments, the other optical components or other components may be used in addition to or alternative to the beam splitting device 157. The detector 109 is configured to generate an object signal that is indicative of the portions of the beam detected by the detector 109. In some embodiments, the object signal is in the form of an electrical signal and transmitted to the computing system 112 for processing.

The computing system 112 includes a processor 114 and memory 116. The processor 114 may include any component or group of components that are configured to execute, implement, and/or perform any of the processes or functions described herein or any form of instructions to carry out such processes or cause such processes to be performed. In one or more arrangements, the processor 114 may be a main processor of the LIDAR sensing system 100. Examples of suitable processors include microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 114 may include at least one hardware circuit (e.g., an integrated circuit) configured to carry out instructions contained in program code. In arrangements in which there is a plurality of processors, such processors may work independently from each other or one or more processors may work in combination with each other.

The memory 116 may be structured for storing one or more types of data. The memory 116 store may include volatile and/or non-volatile memory. Examples of suitable memory 116 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. In some embodiments, the memory 116 includes a non-transitory computer readable storage medium that is communicably coupled to the processor 114. The computer-readable storage medium may have instructions encoded or otherwise stored thereon that, when executed by the processor, cause the processor to perform any of the operations, steps, or methods described herein. The memory 116 may be a component of the processor 114, or the memory 116 may be operatively connected to the processor 114 for use thereby. In some arrangements, the memory 116 may be located remotely and accessible by the processor 114, such as via a suitable communications device.

The processor 114 is communicably coupled to the light source 102 and may be configured to read and execute instructions from a light source controller 118 stored or programmed on the memory 118. The light source controller 118 may be or include computer-readable instructions to control one or more aspects of the light source 102. The light source controller 118 may be stored on memory 116 as shown. In other implementations, the light source controller 118 may be stored remotely and accessible by various components of the LIDAR sensing system 100. The processor 114 may control the light source 102 in accordance with the instructions from the light source controller 118.

The light source controller 118 may include instructions to generate a pattern for the beam projected from the light source 102. For instance, in some implementations, the beam may be projected from the light source 102 in a pattern having a frequency (e.g., pulsed, saw tooth, etc.). The light source controller 118 may include instructions to generate, for example, a saw tooth signal that corresponds to the frequency pattern of the beam projected from the light source 102. In some embodiments, the light source controller 118 may include instructions that cause the light source 102 to generate a beam that sweeps from a first frequency at a first time to a second frequency over a ramp up time period and from the second frequency back to the first frequency over a ramp down time period. In some embodiments, the light source controller 118 may include instructions to cause the light source to generate one frame or multiple frames. In some embodiments, the multiple frames are periodic and have a set time period between each frame. As will be discussed in further detail below, the frequency pattern of a frame may be used for determining a range and velocity of object 190.

In some embodiments, one or more components of the LIDAR system 101 may be omitted. In some embodiments, various other components of the LIDAR system 101 may be included. It is to be appreciated that FIG. 1 is one example of an implementation of a LIDAR system 101 and that it is not meant to be limiting.

For example, in some embodiments, the LIDAR system 101 may include an interferometer. The interferometer may be or include components arranged to receive the beam from the light source 102, and split the beam into one or more component beams. For instance, the interferometer 110 may split the beam into an object beam and a reference beam. The object beam may be projected towards the wavelength dispersive element 104, and the reference beam may be projected towards a reference mirror. The interferometer may generate an interference pattern based on a difference between light reflected off surfaces of objects in the external environment and light reflected off the reference mirror. The LIDAR sensing system 100 (e.g., processor 114) may determine a distance to the objects based on the interference pattern.

Figure 2:
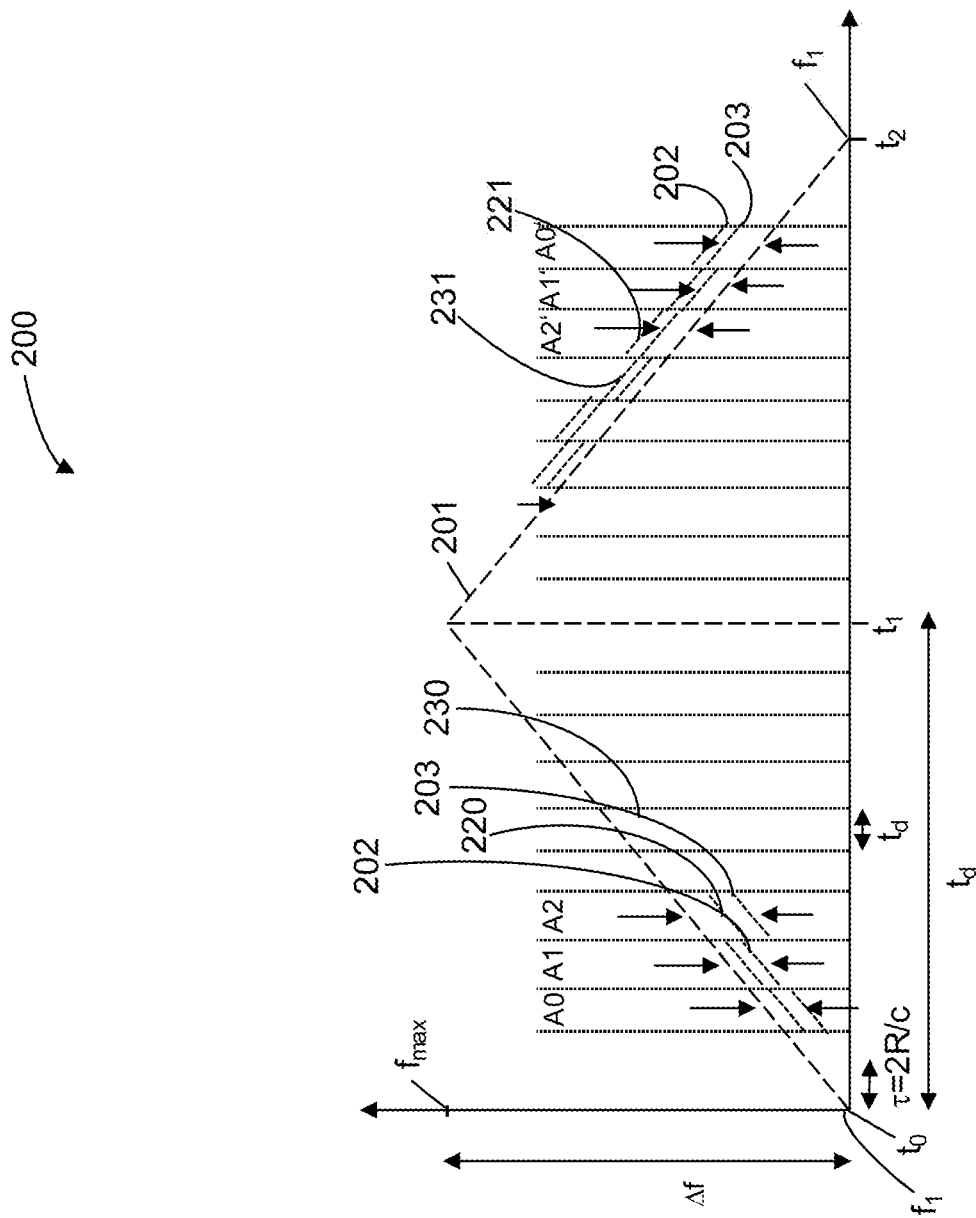
FIG. 2 depicts a graph of a signal profile from a LIDAR system in accordance with an illustrative embodiment.

Referring now to FIG. 2, an example of a corresponding signal profile 200 of the object 190 is shown. Reference to various components of FIG. 1 are made while discussing FIG. 2 for purposes of demonstration. The signal profile 200 includes a y-axis that denotes the frequency and an x-axis that denotes time. In some embodiments, the signal profile 200 is a first "frame" of measurements from the LIDAR system 100. The first frame includes a full sweep of the LIDAR system along the first axis of the FOV 190.

The signal profile 200 includes a reference signal 201, stationary object signals 202, and moving object signals 203.

The reference signal 201 is generated from the light source 102 and represents the frequency of the beam being projected from the light source over time 102. In some embodiments, light source controller 118 generates the reference signal pattern (e.g., a saw tooth pattern) and the processor 114 communicates with the light source 102 to cause the light source 102 to emit a beam over time with the reference signal characteristics (e.g., from a first frequency to a final frequency and back to the first frequency). In some embodiments, the reference signal 201 is presumed to have the characteristics of the pattern stored in the light source controller 118. In some embodiments, the reference signal 201 may be measured by an interferometer, detector 109, a second detector, or with another device.

In some embodiments, the wavelength dispersive element 104 directs the beam at an angle that depends on the wavelength of the beam (e.g., the inverse of the frequency of the beam). For example, the wavelength dispersive element 104 may direct the beam such that when the beam is at a first wavelength λ1, the beam is directed toward the center of a first area A1 of the FOV 190, when the beam is at a second wavelength λ2, the beam is directed toward the center of a second area A2 of the FOV 190, and when the beam is at a third wavelength λ3, the beam is directed toward the center of a third area A3 of the FOV 190. In some embodiments, the angle at which the wavelength dispersive element 104 directs the beam into the FOV 190 may vary linearly with the frequency of the beam.

The light source 102 begins a sweep at a first frequency $f_0$ at a first time $t_0$. The light source 102 continuously sweeps the beam to a maximum frequency $f_{max}$ over a first time period $\Delta t_m$ to a second time $t_1$. The difference between the maximum frequency $f_{max}$ and the first frequency $f_1$ may be referred to in this example as the change in frequency $\Delta f$. The time between the first time $t_0$ and the second time $t_1$ may be referred to in this example as the "ramp up" time. The light source 102 then linearly sweeps the beam back to the first frequency $f_1$ over another time period to a third time $t_2$. The time between the second time $t_1$ and the third time $t_2$ may be referred to in this example as the ramp down time. The time between the first time $t_0$ and the third time $t_2$ may be referred to as a frame. A frame is one cycle of a sweep from the light source 102. In some embodiments, a frame may only include a ramp up or ramp down period.

In this example, the equation for the ramp up time of the reference signal 201 may be given by equation (1) for the ramp-up time and equation (2) for the ramp down time:

$$f(t) = \left(\frac{\Delta f}{\Delta t_m}\right) * t + f_1 \quad (1)$$

$$f(t) = -\left(\frac{\Delta f}{\Delta t_m}\right) * t + \Delta f * \left(2 + \frac{\tau}{\Delta t_m}\right) + f_1 \quad (2)$$

In one example, where the object is stationary relative to the LIDAR system 101, the detected frequency from the object 191 is indicated by the stationary object signal 202. The stationary object signal may include a first signal 220 that denotes the frequency and time that light reflected from object 191 is received during the ramp up period and the object 191 is stationary relative to the LIDAR system 101. The stationary object signal 202 may also include a second signal 221 that denotes the frequency and time that light reflected from object 191 is received during the ramp down period and the object 191 is stationary relative to the LIDAR system 101.

In another example, where the object 191 is stationary relative to the LIDAR system 101, the detected frequency from the object 191 is indicated by the moving object signal 203. The moving object signal 203 includes a first signal 230 that denotes the frequency and time that light reflected from object 191 is received during the ramp up period and the object 191 is moving away from the LIDAR system 101. The moving object signal 203 may include a second signal 231 that denotes the frequency and time that light reflected from object 191 is received during the ramp down period and the object 191 is moving away from the LIDAR system 101.

The stationary object signals 202 and moving object signals 203 are shifted by a time constant T relative to the reference signal 201. The time constant T is the time that it takes the beam to reach an object and reflect back to the LIDAR system 101. Thus, in some embodiments, the time constant T is equal to the 2 times a distance R of the object divided by the speed of light c.

The detected frequency from the object 191 may be used with (or compared to) equation (3) during times when the beam is impinging on (and reflecting from) the object 191 during the ramp up time period and with equation (4) during times when the beam is impinging on (and reflecting from) the object 191 during the ramp down period:

$$f_0(t) = \left(\frac{\Delta f}{\Delta t_m}\right) * (t - \tau) + f_1 \quad (3)$$

$$f_0(t) = -\left(\frac{\Delta f}{\Delta t_m}\right) * (t - \tau) + \Delta f * \left(2 + \frac{\tau}{\Delta t_m}\right) + f_1 \quad (4)$$

That is, the processor 114 may use equations (3) and (4) along with the detected object signals to estimate or determine a velocity and/or position of the object 191. It is to be appreciated that when the beam is not impinging on the object 191 (e.g., because the frequency of the beam and resulting angle is not corresponding to the location of the object 191) there should be no detected light or resulting signals (e.g., moving object signals or stationary object signals). However, there may be a noise in the signal. The processor 114 may then use equations (3) and (4) along with the detected object signals to estimate or determine a velocity and/or position of the object 191.

In some embodiments, the computing system 112 determines the velocity of the objected by calculating a first beat frequency $f_{beat1}$ corresponding to the first signal (e.g., signal 220 or 230) on the ramp up period and a second beat frequency $f_{beat2}$ corresponding to the second signal (e.g., signal 221 or 231) of the detected signals on the ramp down period. In some embodiments, the beat frequency may be calculated for a non-moving object by subtracting the reference signal from the detected signal. In some embodiments the beat frequencies can be used to determine a distance of the object 190 using the known value of the time shift between the reference signal and the detected signal.

The processor 114 may calculate the velocity of the object 191 using the properties of the signal profile 200 and the Doppler effect. The Doppler effect is shown in FIG. 2 as the difference 280 (e.g., the Doppler shift 280) between the stationary object signal 202 and the moving object signal 203. The Doppler shift may be given by equation (5):

$$\text{Doppler Shift} = -\text{Original Frequency} * \left(\frac{v}{c}\right) \quad (5)$$

Thus, the Doppler shift 280 is proportional to the velocity v of the object 181. Accounting for the Doppler shift 280, the first beat frequency $f_{beat1}$ (e.g., the beat frequency corresponding to the ramp up time) may be calculated using equation (6) and the second beat frequency $f_{beat2}$ (e.g., the beat frequency corresponding to the ramp down time) may be calculated using equation (7):

$$f_{beat1} = f(t_3) - f_o(t_3) * \left(1 - \frac{2v}{c}\right) \quad (6)$$

$$f_{beat2} = f_o(t_5) * \left(1 - \frac{2v}{c}\right) - f(t_5) \quad (7)$$

In equations (6) and (7), $t_3$ corresponds to the first signal (e.g., signals 220 or 230) detected on the ramp up time and $t_5$ corresponds to the second signal (e.g., signal 221 or 231) detected on the ramp down time. The distance of object 191 may be determined using equations (8) and the velocity of the object 191 may be determined using equation (9):

$$R \approx \frac{c * t_m}{2\Delta f} * \left(\frac{f_{beat1} + f_{beat2}}{2}\right) \bigg| \text{ when } f_o \sim f_c \text{ and } \frac{v}{c} \ll 1 \quad (8)$$

$$v \approx \frac{c}{2f_c} * \left(\frac{f_{beat1} + f_{beat2}}{2}\right) \bigg| \text{ when } f_o \sim f_c \text{ and } \frac{v}{c} \ll 1 \quad (9)$$

In equations (8) and (9), fc is the center frequency of the object being measured. For example, in the center frequency of the object 191 of FIG. 1 may be given or estimated as the speed of light divided by the second wavelength λ2. Thus, by using a reference signal 201 that rises from a first frequency to a max frequency back to the first the processor 114 is able to determine both the range and velocity of the object (e.g., via accounting for the Doppler effect). It is to be appreciated that FIG. 2 is meant by way of example and that many objects within the FOV of the LIDAR system 101 may be measured, determined, or calculated in a similar manner. That is, the distances and velocities of the objects in the environment can be measured continuously in an entire sweep of the frequency in either 2 dimensions (via a sweep on a first axis) or 3 dimensions (via a sweep along the first axis and throughout many parts or along a second axis).

Figure 3:
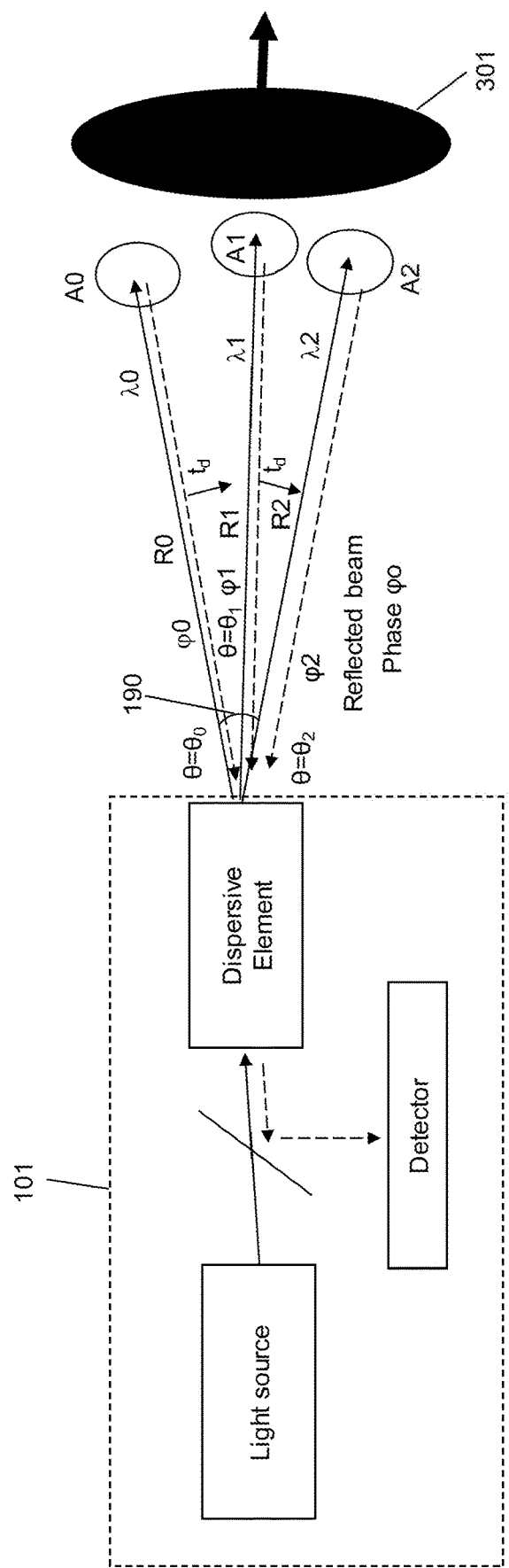
FIG. 3 depicts a block diagram of a LIDAR system in accordance with an illustrative embodiment.
Figure 4:
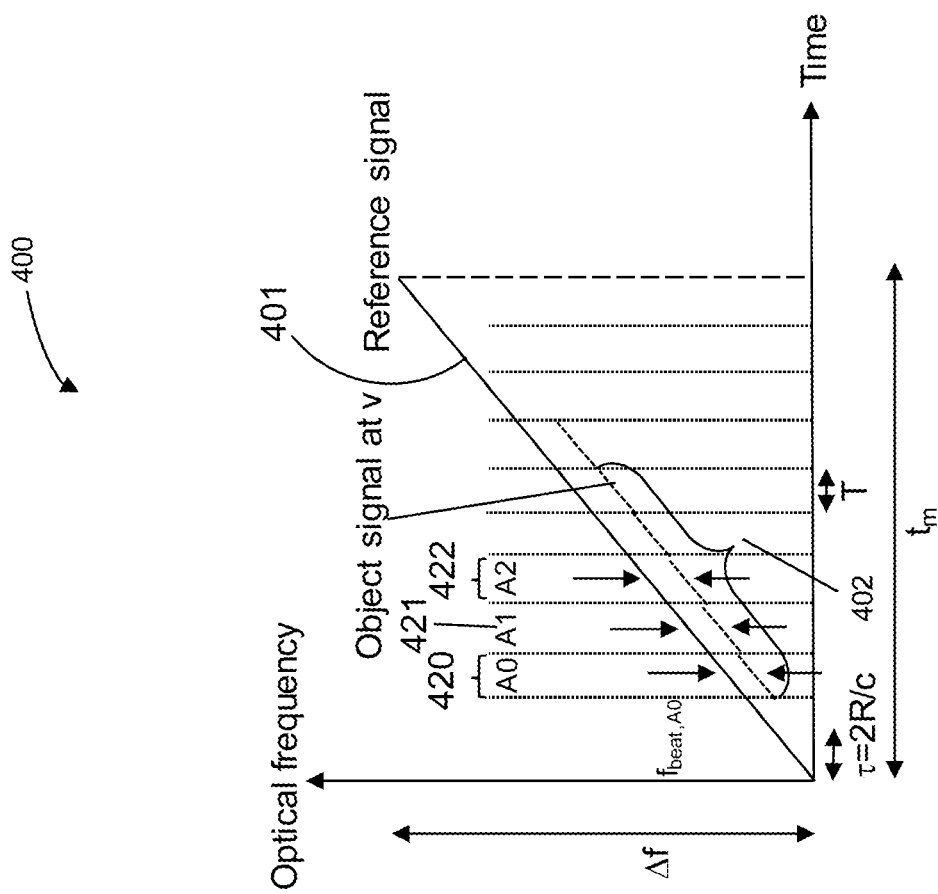
FIG. 4 depicts a graph of a signal profile from a LIDAR system in accordance with an illustrative embodiment.

FIG. 3 depicts a system 300 similar to the LIDAR sensing system 100 of FIG. 1. FIG. 3 includes a LIDAR system 101, a field of view 190, and an object 301. FIG. 4 is referenced along with FIG. 3 for purposes of demonstrating a method of measuring a velocity of object 301 using phase shifts in adjacent segments of a measurement by a LIDAR system 101. FIG. 4 includes a signal profile 400 of a measurement by the LIDAR system 101 in system 300. The signal profile 400 includes a reference signal 401, and an object signal 402. The object signal 402 is detected by the detector 109 during all frequencies where the beam from the light source 102 is directed into the FOV 190 and reflected from the object 301. Similar to the signal profile 200 of FIG. 2, the object signal 402 is shifted on the graph by a time amount equal to T (e.g., the time it takes for the beam to be reflected back to the LIDAR system 101 from the object 301).

The signal profile 400 indicates a first period 420 where the frequencies of the beam are scanning, sweeping across, or corresponding to the first portion A0 of the FOV 190, a second period 421 where the frequencies of the beam are scanning, sweeping across, or corresponding to the second portion A1 of the FOV 190, and a third period 422 where the frequencies of the beam are scanning, sweeping across, or corresponding to the second portion A2 of the FOV 190. Portions of the object signal 402 that correspond to the first, second, and third periods 420, 421, and 422 may be broken down into discrete signals and processed in order to determine the velocity of the object 301. For example, in an embodiment, where a velocity of the object 301 is small enough (e.g., less than 1 m/s) that the distance to the object 301 does not change much during the sweep time from the first frequency to the maximum frequency ($f_1 - f_{max}$), the phase shift of adjacent portions of the object signal 402 that correspond to the first, second, and third periods 420, 421, and 422 may be used to determine the velocity of the object 301.

The phase of a reflected object beam $\varphi_o$ (e.g., beam corresponding to the object signal 402) is related to the phase of the of the reference beam $\varphi_r$ (e.g., object beam of the beam) as shown in equation (10):

$$\varphi_0 = \varphi_r + 2 * R * \left(\frac{2\pi}{\lambda}\right) \quad (10)$$

In equation (10), R is the distance of the object 290 from the LIDAR system and λ is an estimated center wavelength of the relevant portions of the object signal 403. The change of phase with time may be represented using equation (11):

$$d\varphi/dt = 4\pi/\lambda^* dR/dt = 4\pi/\lambda^* v \quad (11)$$

Thus, a change of phase Δφ over a time period T can be used to calculate the velocity. As such, the velocity can be calculating from detecting the phase difference between adjacent portions of the object signal 402 that correspond to the first, second, and third periods 420, 421, and 422. Particularly, the time period T may be set or known by the processor. For example, the time period between the first wavelength λ1 and the second wavelength λ2 (e.g., the first period 420 or the first portion A0 of the FOV) may be used as the time period T. The velocity of the object 301 may be calculated by using equation (12):

$$v = \frac{\Delta \varphi}{T} \frac{\lambda}{4\pi} = \frac{\varphi_{i+1} - \varphi_i}{T} \frac{\lambda}{4\pi} \quad (12)$$

In equation (12), $\varphi_i$ is the initial phase of the object signal 402 at a first of the periods 420, 421, or 422 and $\varphi_{i+1}$ is a phase of the object signal 402 at an adjacent period. However, the adjacent periods must be spaced close together such that λ is nearly equal to $\lambda_i$ and both are nearly equal to (e.g., within 1-5% of) $\lambda_{i+1}$. Equation (12) should be constrained to situations where the change of phase Δφ is greater than negative pi π and less than pi π. That is, the phase shift can be used to accurately calculate the velocity of object 301 up to a maximum velocity $V_{max}$ which may be calculated for a particular LIDAR system 101 by equation (13)

$$V_{max} = \frac{\lambda}{4T} \quad (13)$$

In some embodiments, the phase shift between adjacent portions of the object signal 402 may be calculated by performing a Fast Fourier Transform (FFT) on the adjacent portions of the object signal 402. The amplitude of the FFT can be used to calculate the distance (i.e., or range) of the object 301 from the LIDAR system 101. The phase shift between the adjacent portions of the object signal 402 may be calculated using the FFT of each signal at the distance of the object 301 and subtracting a first phase at the distance of the first of the object signal 402 from a second phase at the distance of the second (e.g., or adjacent) object signal 402. In some embodiments, the calculation of the phase shift may be done multiple times using multiple adjacent portions of the object signal 402 and the multiple calculated phase shifts may then be averaged together to reduce any potential for error in the calculation of velocity.

In some embodiments, the velocity of object 301 may be measured without using adjacent portions of the object signal 402. This is advantageous in situations where the object 301 may be small or far away from the LIDAR system 101 such that the object signal 402 does not have enough (or possibly any) adjacent portions that can be used to calculated the phase shift. For example, FIG. 5 depicts one way of measuring or calculating the velocity of object 301 without using adjacent portions of the object signal.

Figure 5:
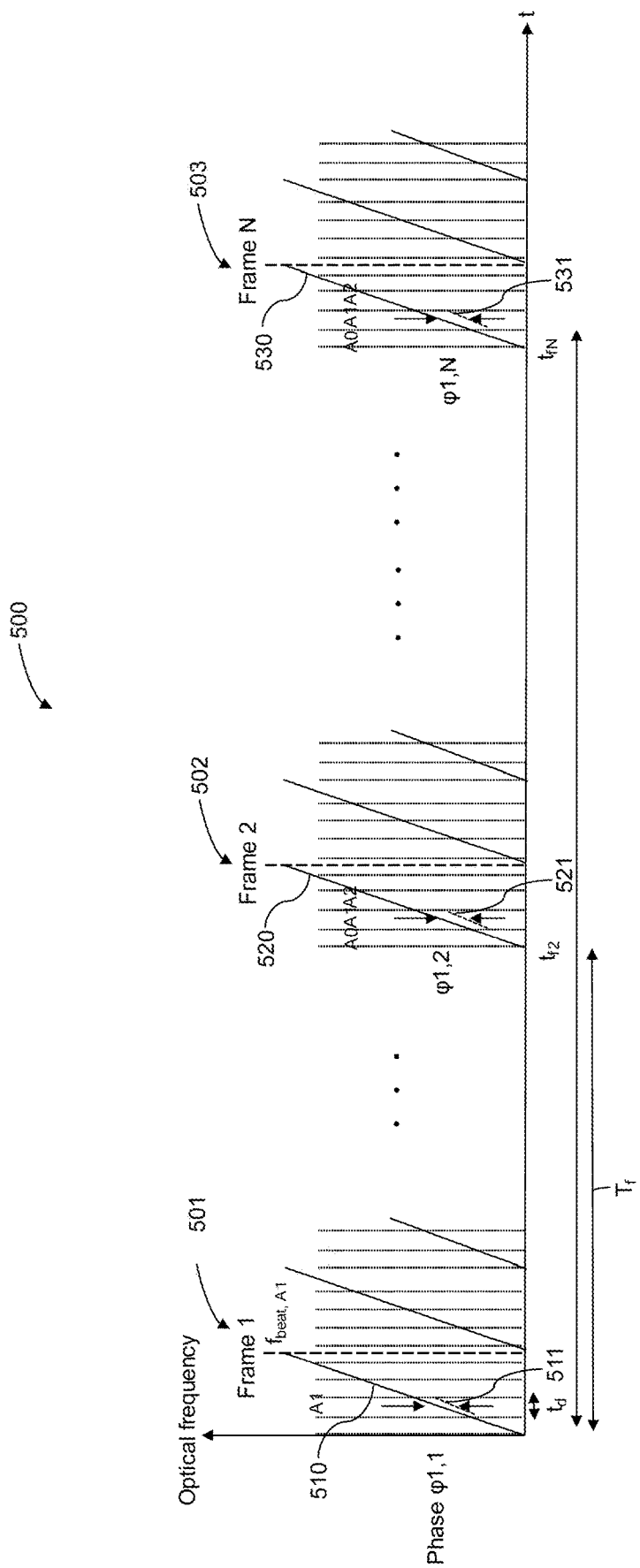
FIG. 5 depicts a graph of a signal profile that contains multiple frames from a LIDAR system in accordance with an illustrative embodiment.

FIG. 5 depicts multiple frames of a signal profile 500 that may be used to calculate the phase shift. The signal profile 500 includes a first frame 501, a second frame 502, and N frame 503. The first frame 501 includes a first reference signal 510 and a first object signal 511. The second from 502 includes a second reference signal 520 and a second object signal 521. The N frame includes an N reference signal 530 and an N object signal 531. That is, in some embodiments, two or more frames may be used to calculate the phase shift between the object signals 511, 521, and 531 in adjacent frames. In some embodiments, such as when the object 301 is moving very slowly (e.g., velocity is less than the wavelength divided by 4 times the time period T), the phase shift may be calculated between adjacent frames that are more than one frame apart from one another. The LIDAR system 101 may assume that each of the object signals 511, 521, and 531 correspond to the same object 301 because of where the object signals are received relative to the reference signals 510, 520, and 530 in each frame. For example, the object signals 511, 521, and 531 all correspond to the same (or similar) frequencies of the reference signals 510, 520, and 530 in each frame. In some embodiments, the frames 501, 502, and 503 are adjacent to other frames at a consistent time period $T_f$.

For example, in some embodiments, the velocity of the object 301 may be calculated between the first frame 501 (or a first frame i) and a frame N time periods $T_f$ away using equation (14):

$$v = \frac{\varphi_{i+N} - \varphi_i}{N * T_f} \frac{\lambda}{4\pi} \tag{14}$$

As stated above, a resolution of the measurable velocity $v_{res}$ of object 301 may be limited in situations where the phase shift is very small (e.g., the velocity of the object 301 is very small) between adjacent frames. In some such embodiments, the processor 114 may choose object signals 511, 521, or 531 from frames further apart in order to accurately measure, calculate, or estimate the velocity of the object. For example, the resolution of measurable velocity $v_{res}$ between adjacent frames is limited to the minimum measurable phase shift $\Delta\varphi_{min}$ of the LIDAR system 101, which may be particular for each implementation. The resolution of measurable velocity $v_{res}$ may be calculated using equation (15):

$$v_{res} = \frac{\Delta\varphi_{min} * \lambda}{4\pi * T_f} \tag{15}$$

Thus, in some embodiments, the frames chosen by the processor 114 to calculate the velocity may be increased in order to improve the resolution of the measurable velocity $v_{res}$. For example, resolution of measurable velocity $v_{res}$ may be refined by choosing frames that are N frames apart. In this way, the velocity of objects that are moving very slowly relative the LIDAR system 101 may still be measured or calculated with precision. The resolution of the measurable velocity $v_{res}$ between object signals 511, 521, and 531 that are N frames apart may be calculated using equation (16):

$$v_{res} = \frac{\Delta\varphi_{min} * \lambda}{4\pi * N * T_f} \tag{16}$$

However, it is to be appreciated that the maximum velocity measured between the N amount of frames should be restricted to situations where the phase shift between the N amount frames $\Delta\varphi$ is greater than negative pi $\pi$ but also less than pi $\pi$ in order for the velocity to be determined uniquely without error due to major shifting. In other words, the maximum velocity that can be uniquely measured between N frames can be calculated using equation (17):

$$V_{max} = \frac{\lambda}{4N * T_f} \tag{17}$$

Figure 6:
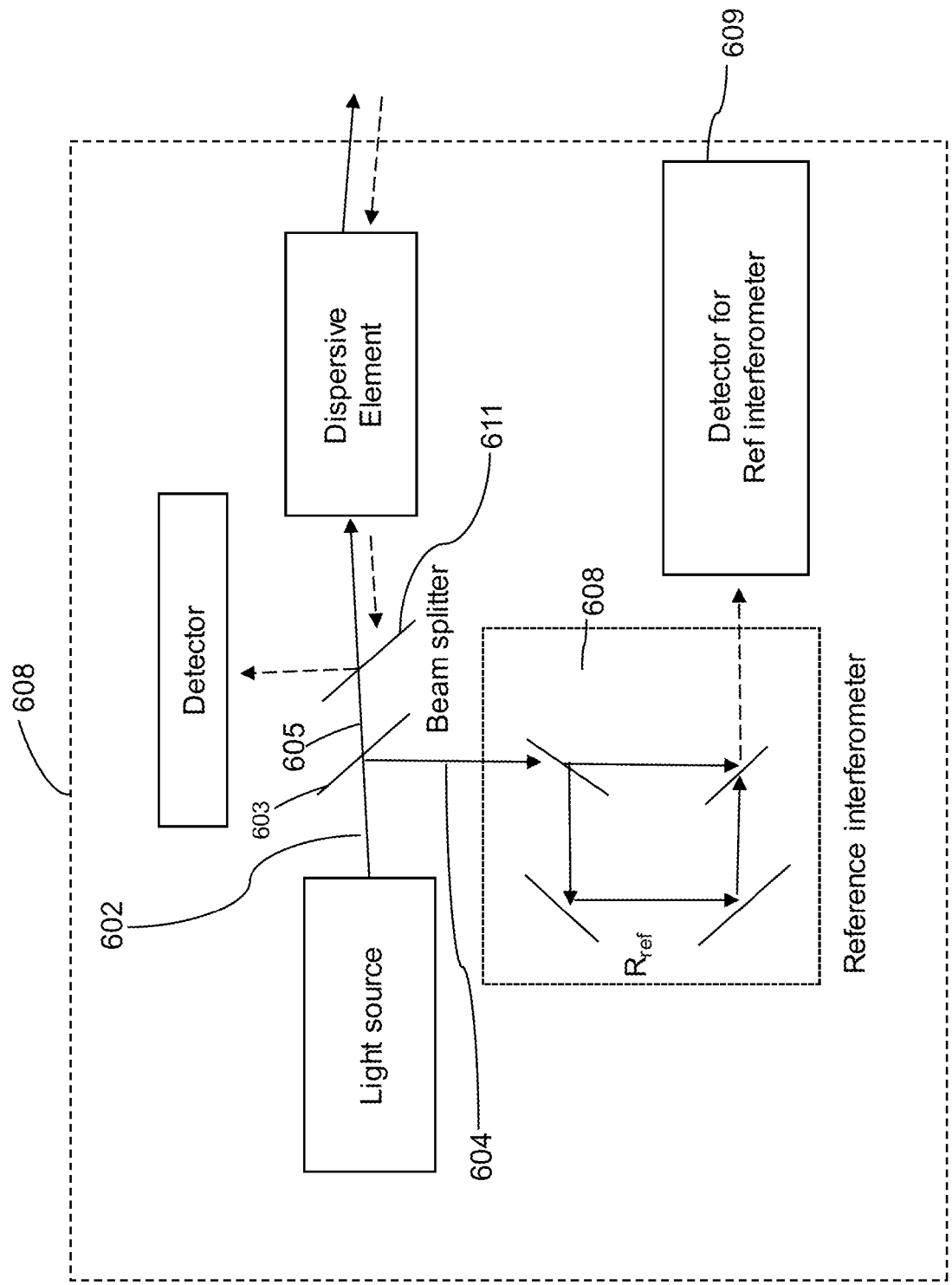
FIG. 6 depicts a block diagram of a LIDAR system in accordance with an illustrative embodiment.

FIG. 6 depicts a LIDAR system 600 in accordance with an illustrative embodiment. As referenced in FIG. 1, in some embodiments, the LIDAR system 101 may include an interferometer. The LIDAR system 600 includes various similar components as the LIDAR system 101 and an interferometer 603. That is, the LIDAR system 600 includes a light source 102, a wavelength dispersive element 104, and a detector 109. In some embodiments, the interferometer 603 may be a reference interferometer implemented as a Mach-Zehnder interferometer. In some embodiments, the light source 102 projects a beam 602 toward a beam splitter 603 the beam splitter 603 splits the beam 602 into a reference beam 604 and an object beam 605. The reference beam 604 is directed toward an input of the interferometer 608. The interferometer 608 then diffracts, reflects, or otherwise directs the reference beam 604 over a known distance and the reference beam 604 is received at a second detector 609. In some embodiments, the second detector 609 and the detector 109 may be the same detector and be arranged such that the detector receives both the reference beam 604 and reflected portions of the object beam 605 from the FOV.

In some embodiments, the object beam 605 is directed, refracted, or passes through the beam splitter 603 and passes through a half-mirror 611. The object beam 605 impinges on the wavelength dispersive element 104 and is directed into the FOV. The object beam 605 may impinge on objects within the FOV and be reflected or scattered back to the wavelength dispersive element 104. The wavelength dispersive element 104 may then direct the reflected portions of the object beam 605 to the detector 109. In some embodiments, the reflected portions of the object beam 605 impinge on the half mirror 611 and are reflected, refracted, or otherwise directed to the detector 109.

In some embodiments, the interferometer 603 allows for the LIDAR system 600 to generate interference signals between the reflected portions of the object beam 605 and the reference beam 604 in order to calculate beat signals. In some embodiments, the interferometer is used to monitor the frequency sweep and identify segments (e.g., such as the time periods in which the beam is directed toward the first portion of the FOV A0) in the ramp-up and ramp down portions of a frame. In some embodiments, the interferometer 603 allows for the processor 614 to calculate a distance (e.g., or range) of an object in the FOV using a calculated interference signal between the reflected portions of the object beam 605 and the reference beam 604 using the known distance of travel of the reference beam 604.

Figure 7A:
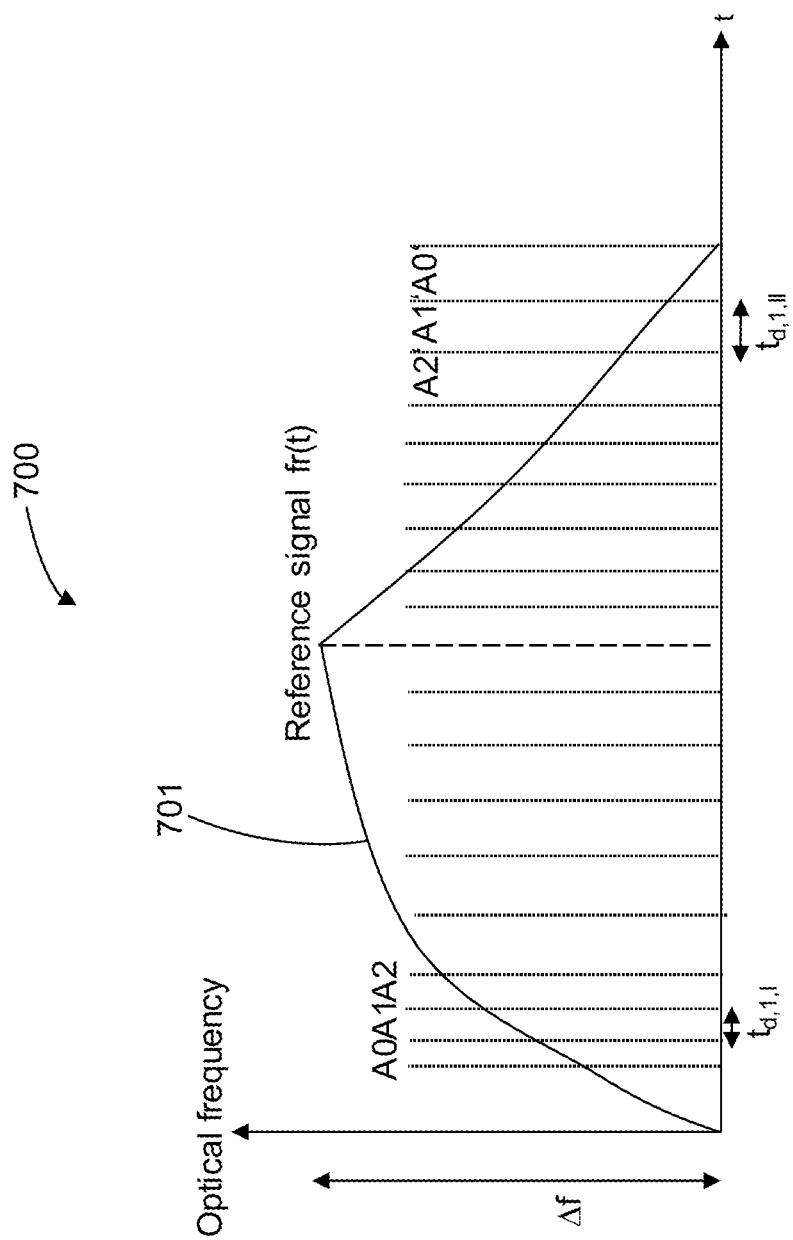
FIG. 7a depicts a graph of a signal profile from a LIDAR system that includes an interferometer in accordance with an illustrative embodiment.
Figure 7B:
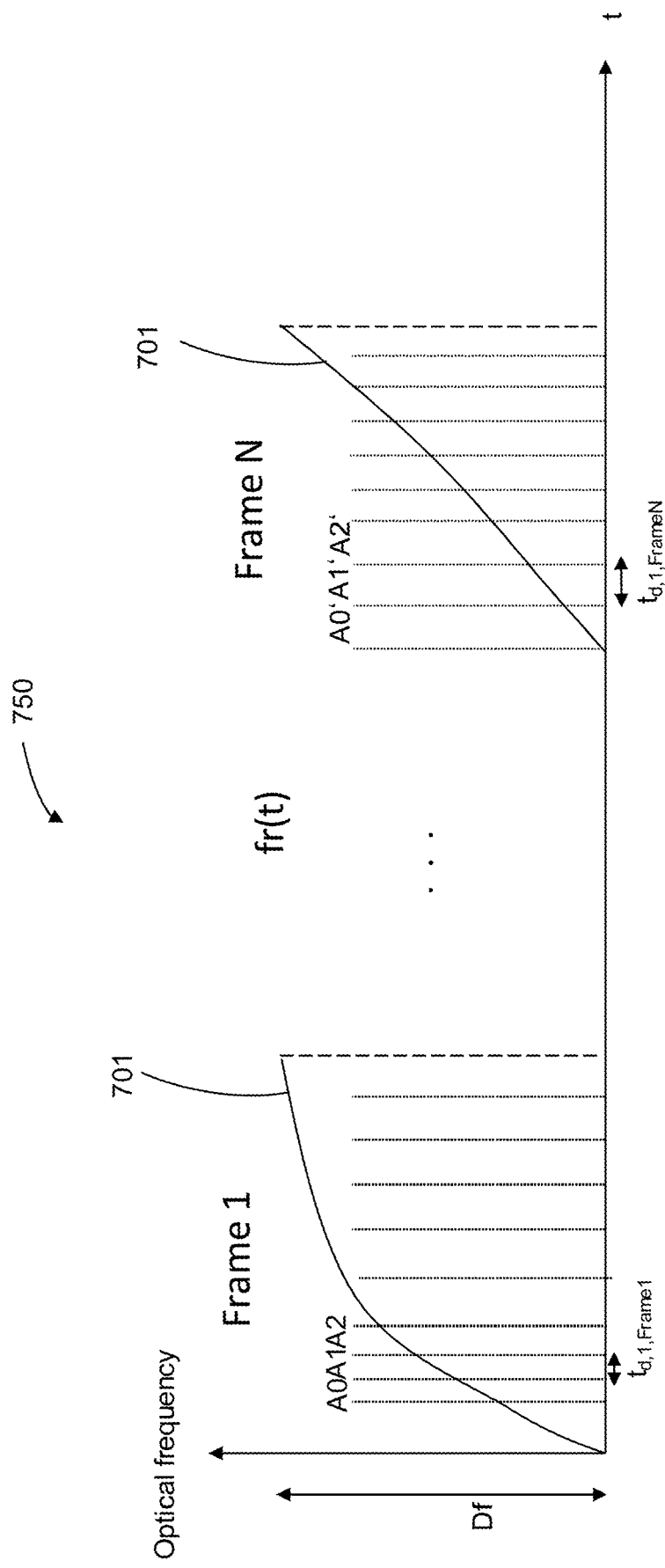
FIG. 7b depicts a graph of a signal profile of multiple frames from a LIDAR system that includes an interferometer in accordance with an illustrative embodiment.
Figure 8B:
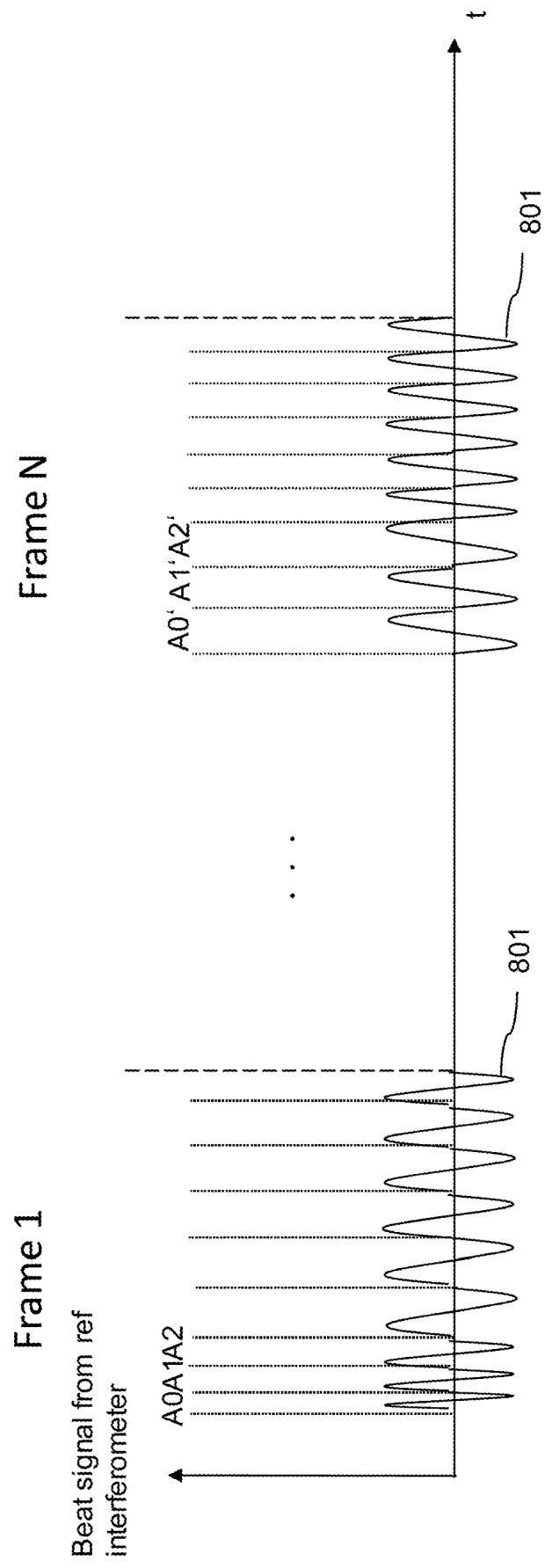
FIG. 8b depicts a beat signal profile of a beat signal corresponding to the signal profile of FIG. 7b in accordance with an illustrative embodiment.

FIG. 7a depicts a signal profile 700 over a ramp up and ramp down period (e.g., a frame) of a LIDAR system in accordance with an illustrative embodiments. FIG. 7a depicts a signal profile 750 over multiple ramp up periods (e.g., multiple frames) of a LIDAR system in accordance with an illustrative embodiments. FIG. 8a depicts a beat signal profile 800 of a beat signal from the interferometer that corresponds to the signal profile 700. FIG. 8b depicts a beat signal profile 850 of a beat signal from the interferometer that corresponds to the signal profile 750 over the multiple frames. Reference to FIG. 6 while discussing FIGS. 7 and 8 is made for purposes of demonstration. The signal profile 700 includes a reference signal 701. In some embodiments, the reference signal 701 is non-linear intentionally or non-intentionally due to constraints of the light source 102. The non-linearity of the reference signal 701 may distort the amount of time that the object beam 605 is directed toward particular portions of the FOV (e.g., such as A0, A1, or A2). As a result, calculations of object signal positions and object signal size may also be distorted. In order for the LIDAR system 600 (e.g., processor 114) to correct for the distortions while calculating the range and velocity of one or more objects in the FOV, the beat signal profile 800 may be used as a reference. For example, the beat signal profile 800 includes a beat signal 801 that indicates the time that the object beam is swept passed each portion (e.g., A0, A1, and A2) of the FOV. In some embodiments, the beat signal 801 may indicate the time and angular position of the object beam by creating a cosine graph where each cycle of the cosine is related to one portion of the FOV. As such, the beat signal 801 from the interferometer 603 may be used to identify the segments that the object beam 605 is projected toward or swept over particular portions of the FOV even if there is non-linearity in the reference signal. Further, the beat signal 801 may also be used to identify the time that ramp up and ramp down regions of a frame occur even if they are also non-identical. In other words, the beat signal 801 may be used by the processor 114 to compensate the non-linearity of the frequency sweep and ensure that accurate positions, distances, and velocities are measured for each object in the FOV. In some embodiments, the LIDAR system 600 may calculate and compensate for non-linearity of the reference signal 701 by detecting (e.g., via the interferometer) the reference signal 701 and recording the times that the reference beam 701 is at particular frequencies and cross referencing received object signals based on the recording. Although description is made between FIGS. 7a and 8a, it is to be appreciated that the signal profile 750 of FIG. 7b and the corresponding beat profile of FIG. 8b may be used to calculate and compensate for non-linearity of the reference signals in each frame.

Figure 9:
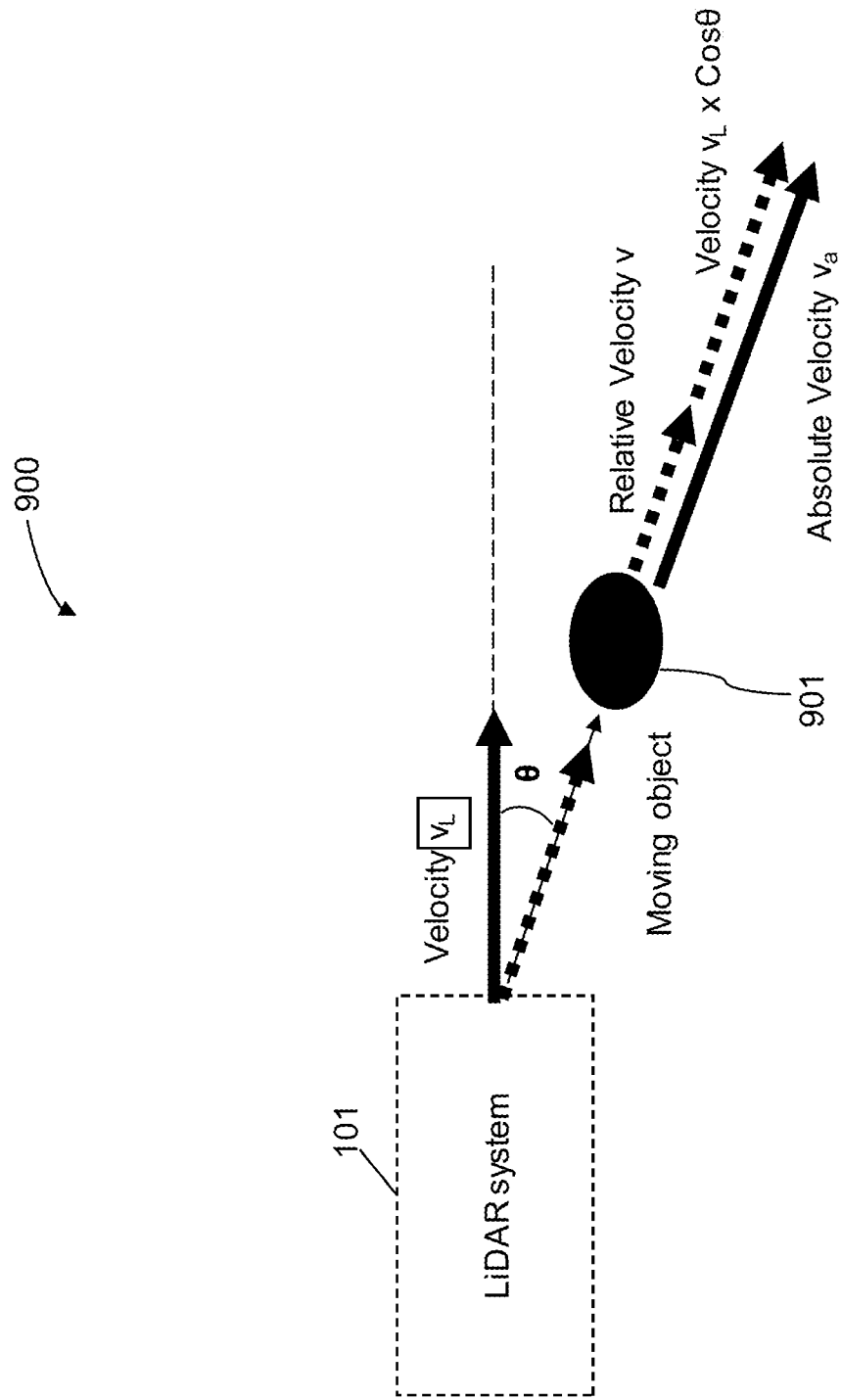
FIG. 9 depicts a LIDAR system in motion in accordance with an illustrative embodiment.

FIG. 9 depicts a LIDAR system in motion 900 in accordance with an illustrative embodiment. The LIDAR system in motion 900 includes a LIDAR system 101 (or 600) moving at a velocity $v_L$. In some embodiments, a LIDAR system 101 may have a velocity $v_L$ because it is on a vehicle (e.g., such as a car or autonomous car). The LIDAR system 101 may determine the velocity $v_L$ using sensors connected. For example, the LIDAR system 101 may include a geographic position system (GPS) that is coupled to the processor 114 and indicates to the processor 114 the speed of the LIDAR system 101. In some embodiments, the processor 114 may be connected to other sensors (e.g., such as a speedometer) that indicate the velocity $v_L$. The LIDAR system 101 may determine an angle θ from an axis 980 normal to the LIDAR system 101 in which the object is located based on the frequency at which an object signal is received. The LIDAR system 101 may use the determined, received, or accessed, velocity $v_L$ in order to calculate an absolute velocity $v_a$ of an object 901 along the angle θ. For example, as explained above, the LIDAR system 101 may sense the object 901 and calculate a distance (e.g., or range) of the object 901 and velocity $v_O$ of the object 901 relative to the LIDAR system 101. The LIDAR system 101 (e.g., processor 114) may calculate the absolute velocity $v_a$ of the object 901 using this measured, determined, or calculated information. For example, the LIDAR system 101 may determine the absolute velocity of the object 901 using equation (18)

$$v_a = v_O + v_L * \cos(\theta) \tag{18}$$

Figure 10:
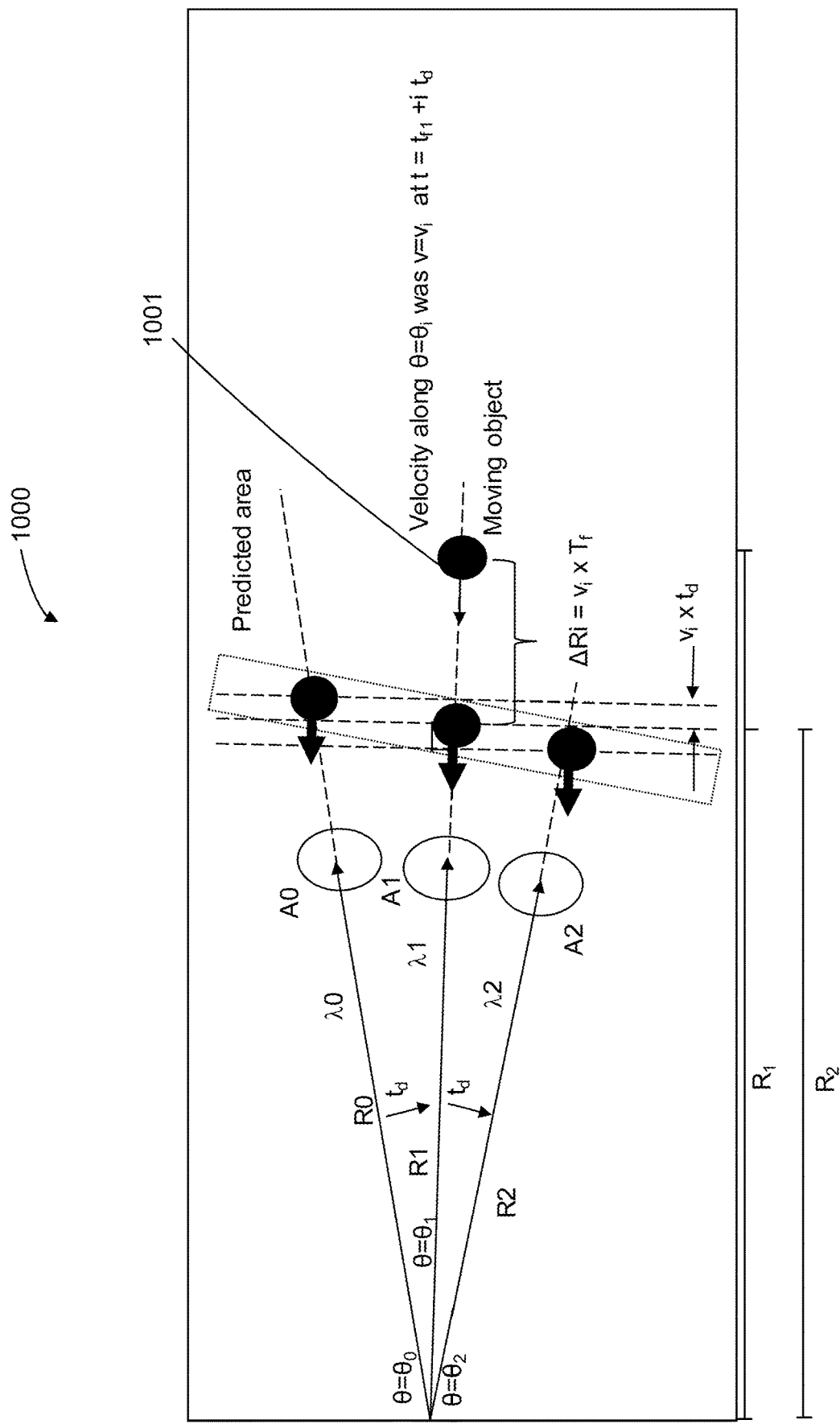
FIG. 10 depicts a field of view (FOV) of a LIDAR system in accordance with an illustrative embodiment.

FIG. 10 depicts a field of view (FOV) 1000 of a LIDAR system (e.g., 102 or 600) in accordance with an illustrative embodiment. In some embodiments, the FOV 1000 may be the FOV 190 described above. The FOV 1000 includes an object 1001 that is detected during a first frame from the LIDAR system 101. The object 1001 may be measured or calculated by the LIDAR system 101 to be at a first angle $\theta_1$ relative to an axis 1050 normal to the LIDAR system 101, a first distance $R_1$ (i.e., or range) from the LIDAR system 101, and to have a first velocity $v_1$ along the first angle $\theta_1$ relative to an axis 1050 normal to the LIDAR system 101. The LIDAR system 101 may predict the position of the object 1001 in the next frame (or subsequent frames) using the calculated or measured characteristics. The LIDAR system may predict the position of the object 1001 in order to enhance the signal-to-noise ratios of signals in the next frame (or subsequent frames) and also to allow for superior object tracking over time. In other words, the LIDAR system 101 detects and calculates the first velocity $v_1$ of object 1001 and the first velocity $v_1$ only indicates the velocity of the object 1001 on the first angle $\theta_1$. Thus, by tracking the object 1001 over multiple frames an absolute velocity can be determined by also determining a second velocity component that is perpendicular to the first velocity $v_1$. However, if the object 1001 is moving very quickly, the LIDAR system 101 may need to predict the location of object 1001 in the second frame (or subsequent frames) in order to ensure that the same object 1001 is being measured in the second frame (e.g., as opposed to a second object).

That is, the FOV 1000 also includes a predicted area 1020 of object 1001 in the next frame (i.e., a second frame) based on the calculated or measured first velocity $v_1$, first angle $\theta_1$, and first distance $R_1$ of the object 1001 in the first frame. The LIDAR system 101 may calculate a predicted change in range $\Delta R$ between the first and second frames by multiplying the time between frames $T_f$ by the first velocity $v_1$. The LIDAR system 101 may determine an expected second range $R_2$ of the object 1001 to be at a distance of $R_1$ added to the predicted change in range $\Delta R$. An object detected at the second range $R_2$ at the second frame may then be assumed to be the object 1001.

Figure 11:
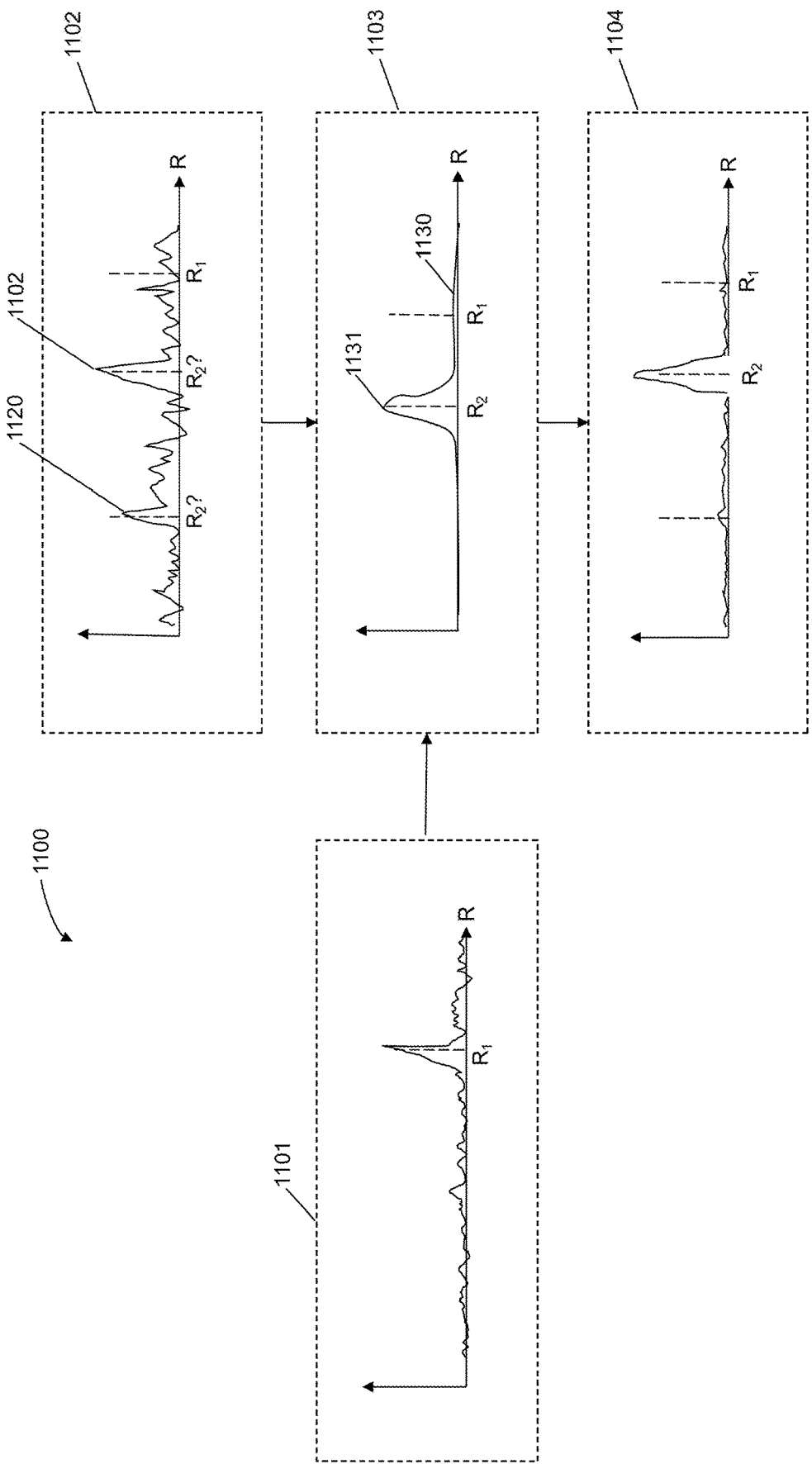
FIG. 11 depicts a diagram of filtering an object signal in accordance with an illustrative embodiment.

FIG. 11 depicts a diagram 1100 of filtering FFT signals of an object signal in accordance with an illustrative embodiment. The diagram 1100 includes a first FFT signal 1101, a second FFT signal 1102, and a filter FFT function 1103. The first FFT signal 1101 is a FFT of the object 1001 at the first frame (e.g., first position as indicated in FIG. 10). The distance of the object is determined to be at the first distance $R_1$. The processor 114 may calculate the predicted second range $R_2$ (e.g., using the first velocity measured at the first frame) at a subsequent frame (i.e., the second frame) and generate the filter FFT function 1103. The filter FFT function 1103 includes a filer signal 1130 that has a peak 1131 that corresponds to the second range $R_2$. In some embodiments, the FFT function 1103 may be a Gaussian or a Squared filter with a peak that corresponds to the second range $R_2$. The second FFT signal 1102 corresponds to an FFT of an object signal captured during the second frame. The second FFT signal 1102 contains the second peak 1120 but also contains noise 1121. The second FFT signal 1102 may then be multiplied by the filter FFT function 1103 in order to generate a FFT signal 1104 that has reduced noise. The FFT signal 1104 (and/or corresponding function) may then be used by the processor 114 to perform the one or more operations described herein. It is to be appreciated that FIGS. 10 and 11 are meant by way of example only. That is, in some embodiments, depending upon the particular implementation, other methods or steps may be used to predict the range of the object in the second frame. For example, the LIDAR system 101 may monitor the position of objects (e.g., object 1001) over time and determine all components of each objects velocity and use the components to generate a filter function for subsequent frames. In some embodiments, acceleration of the LIDAR system 101 is also compensated for when determining the filter function. In some embodiments, the first and second frames are an N amount of frames away from one another. In some embodiments, other forms of transforms instead of or in addition to fast Fourier transforms (FFT) may be implemented.

Figure 12:
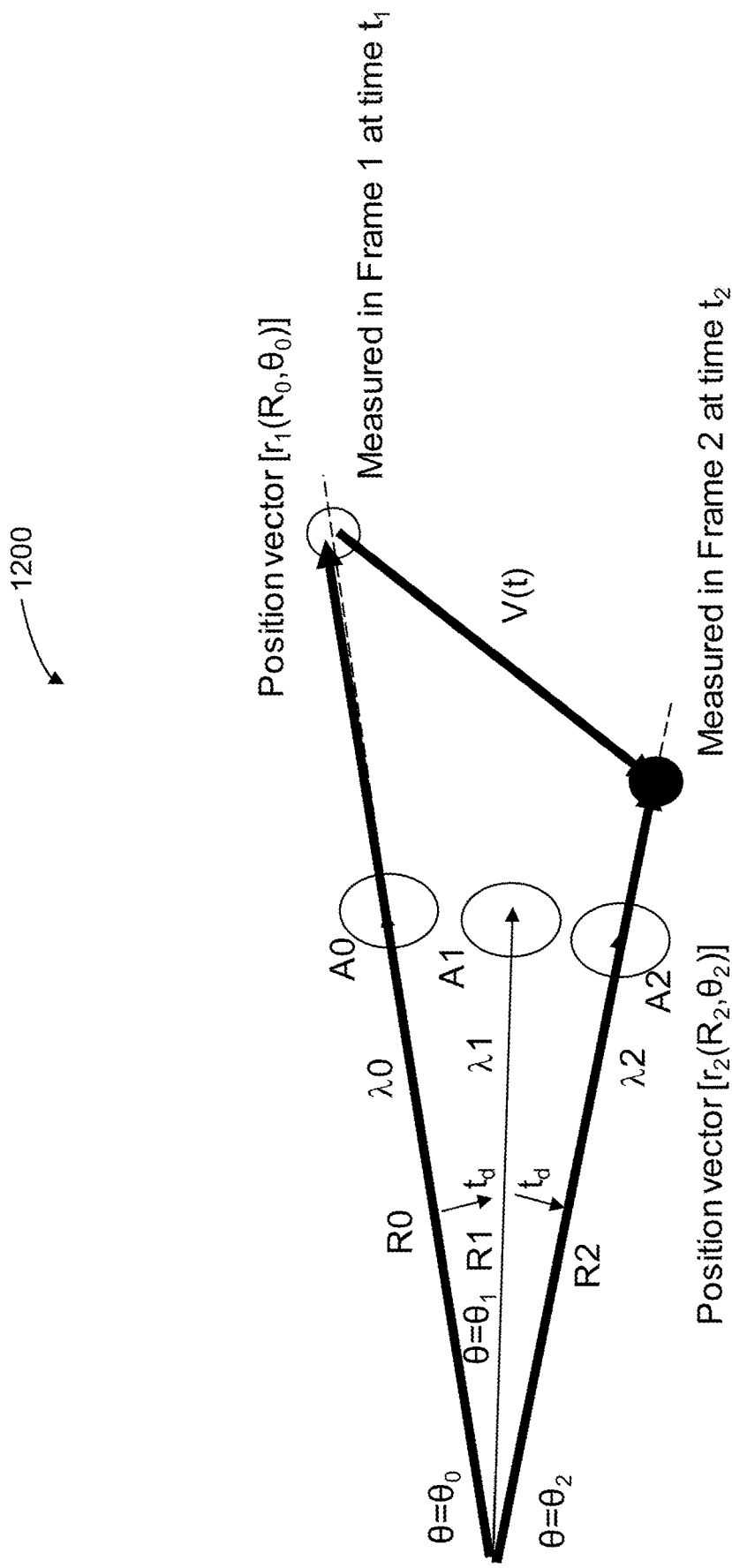
FIG. 12 depicts a FOV of a LIDAR system in accordance with an illustrative embodiment.

FIG. 12 depicts a field of view (FOV) 1200 of a LIDAR system (e.g., 102 or 600) in accordance with an illustrative embodiment. The FOV 1200 depicts a measured location of object 1001 in the FOV 1001. That is, the FOV 1200 depicts the first range $R_1$ and first angle $\theta_1$ of the object 1001 at a previous frame (i.e., the first frame) and the second range $R_2$ and second angle $\theta_2$ of the object 1001 as measured or detected at the second frame. The processor 114 may use the information of the measured object at the first and second frames to calculate a velocity vector $v(t)$ of the object 1001. In some embodiments, the velocity vector $v(t)$ may be determined by subtracting a position vector $r_2(R_2, \theta_2)$ that corresponds to the position of the object 1001 in the second frame from a first position vector $r_1(R_1, \theta_1)$ that corresponds to the position of the object 1001 in the first frame and dividing the result by the time between the second frame and the first frame. In some embodiments, the velocity vector $v(t)$ may be determined in other ways such as converting the position vectors to different coordinate systems (e.g., a Cartesian coordinate system) before calculating the velocity vector $v(t)$.

It is to be appreciated that FIGS. 10-12 are meant by way of example only. That is, in some embodiments, depending upon the particular implementation, other methods or steps may be used to predict the range of the object in the second frame. For example, the LIDAR system 101 may monitor the position of objects (e.g., object 1001) over time and determine all components of each objects velocity and use the components to generate a filter function for subsequent frames. In some embodiments, one or more objects may be traced, predicted, and measured over multiple frames. In some embodiments, acceleration of the LIDAR system 101 is also compensated for when determining the filter function. In some embodiments, the first and second frames are an N amount of frames away from one another. In some embodiments, other forms of transforms instead of or in addition to fast Fourier transforms (FFT) may be implemented.

Figure 13:
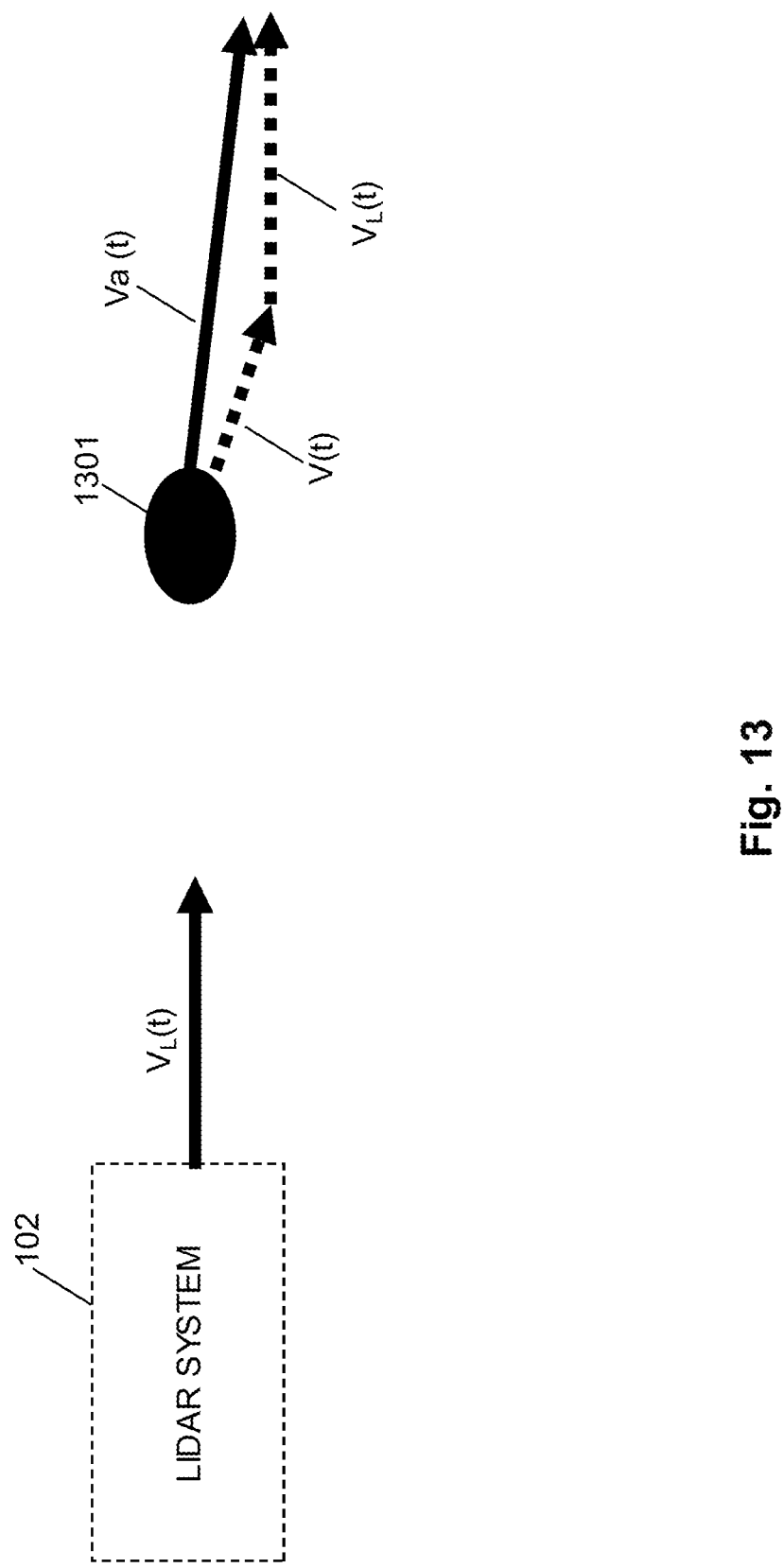
FIG. 13 depicts a LIDAR system in motion in accordance with an illustrative embodiment.

FIG. 13 depicts a LIDAR system in motion 1300 in accordance with an illustrative embodiment. The LIDAR system in motion 1300 may include a LIDAR system (e.g., such as the LIDAR systems described herein) moving a velocity denoted by the velocity vector $v_L(t)$ and an object 1301. The object 1301 may have a velocity vector $v(t)$ relative to the LIDAR system 101 that is detected, measured, or calculated by the LIDAR system 101. The velocity vector of the LIDAR system 101 $v_L(t)$ may be added to the velocity vector $v(t)$ of the object 1301 to determine an absolute velocity vector $v_a(t)$ of the object 1301 relative to an external environment to the LIDAR system 101. In some embodiments, where the LIDAR system 101 is accelerated (e.g., a vehicle that has the LIDAR system 101 onboard is accelerated) the velocity vector of $v_L(t)$ may change and the predicted locations of the object 1301 relative to the LIDAR system in subsequent frames (e.g., over time) may be adjusted accordingly. In this way, the LIDAR system 101 is able to measure, detect, and calculate one or more objects within the FOV in order to trace, predict, or estimate the location of each of the objects relative to the LIDAR system over time, which allows the LIDAR system 101 to be implemented in many different applications (e.g., on an autonomous vehicle) and provide safety benefits thereto.

Figure 14:
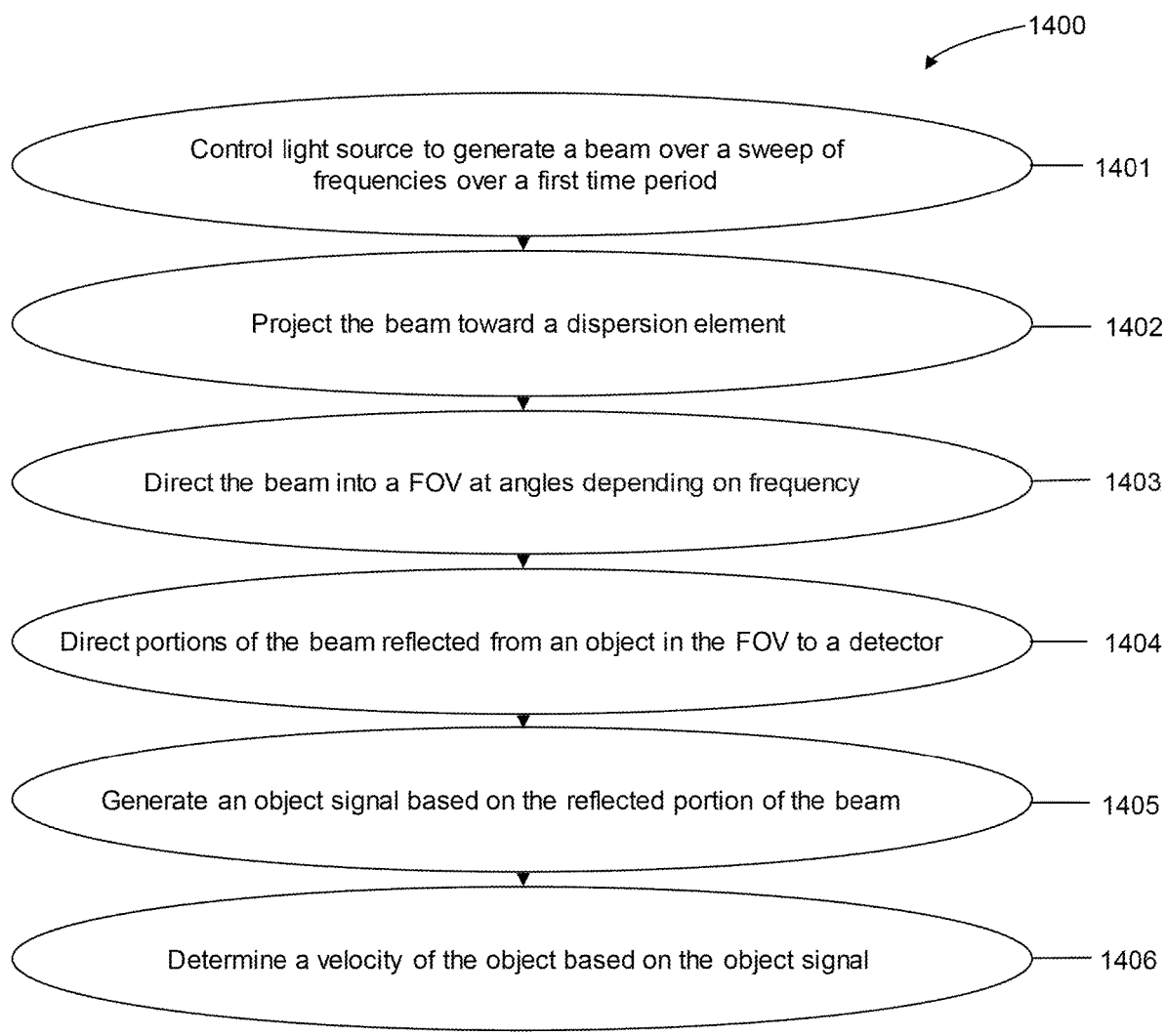
FIG. 14 depicts a flow diagram of a method for calculating velocities of objects within a FOV of a LIDAR system in accordance with an illustrative embodiment.

FIG. 14 depicts a flow diagram of a method 1400 for calculating velocities of objects within a FOV of a LIDAR system in accordance with an illustrative embodiment. At an operation 1401, the processor controls or causes the light source to generate a beam over a sweep of frequencies over a first time period. In some embodiments, the processor may cause the light source to generate a beam that sweeps from a first frequency at a first time continuously to a second frequency at a second time. In some embodiments, the sweep of the beam over the frequencies is linear with a particular slope. In some embodiments, the sweep of the beam over the frequencies is non-linear. In some embodiments, the processor further causes the light source to generate a beam that sweeps from the first frequency to the second frequency during a ramp up time period and back to the first frequency during a ramp down time period. In some embodiments, the processor uses a light source generator to determine a pattern of the sweep. In some embodiments, the processor may cause the light source to re-sweep the frequencies at a time after the first time. That is, the processor may cause the light source to re-sweep the frequencies to generate multiple frames. In some embodiments, each the multiple frames are separated from adjacent frames by a set, known, or predetermined time period.

At an operation 1402, the LIDAR system projects the beam toward a wavelength dispersive element. In some embodiments, the beam may be projected toward one or more wavelength dispersive elements. The wavelength dispersive elements may include volume gratings, diffraction gratings, or other types of diffraction gratings disposed within or on a combiner or other device. In some embodiments, the wavelength dispersive elements may include a crystal, a prism, or other wavelength dispersive device in combination with other optical elements such as mirrors or lenses.

At an operation 1403, the beam is projected or directed from the wavelength dispersive elements into a FOV of the LIDAR system at angles depending on the frequency of the beam. That is, the beam (or portion of the beam) may impinge on the wavelength dispersive element with an angle of incidents that is constant throughout the entire frequency sweep of the beam. The wavelength dispersive elements reflect, direct, disperse, or project the beam into the FOV based on the frequency of the beam. That is, the first frequency may be projected at first angle into the FOV and the last frequency may be projected at a second angle into the FOV. The sweep of the beam ensures that all angles between the first angle and the second angle in the FOV are scanned. For a particular LIDAR system or wavelength dispersive element, the angle at which each particular frequency of the beam is projected into the FOV is known, thus the LIDAR system can determine an angular position of an object based on the frequency of portions of the beam that are received at the detector.

At an operation 1404, portions of the beam reflected from an object in the FOV are directed to a detector. In some embodiments, the detector is positioned to receive portions of the beam that are reflected from the object in the FOV. In some embodiments, the wavelength dispersive element is configured to receive the portions of the beam reflected from the object in the FOV and direct the reflected portions of the beam to the detector. In some embodiments, one or more other optical elements may be used and arranged to direct the reflected portions of the beam to the detector.

At an operation 1405, the detector generates an object signal based on the received reflected portions of the beam. The detector receives the reflected portions of the beam and generates an object signal. In some embodiments, the object signal is an electrical signal (e.g., either analog or digital) that may be transmitted to a processor of the LIDAR system or detector for processing. In some embodiments, the object signal is immediately stored in memory for processing at a later time. In some embodiments, the object signal includes noise or other imperfections that require processing in order to identify an object and/or calculate a velocity or position of the object. In some embodiments, the object signal includes all outputs of the detector over a specified time period and portions of the object signal may be identified as a first portion or a second portion.

At an operation 1406, the LIDAR system determines a velocity of the object based on the detected light corresponding to the first time period (i.e., the object signal). In some embodiments, the processor uses the characteristics of the object signal and the reference signal to determine the velocity of the object. For example, a reference signal that is saw-toothed shaped (e.g., or rises and then falls) allows for a processor to calculate the distance and velocity of the object based on the Doppler effect. In some embodiments, the processor uses adjacent portions of a first object signal that corresponds to an object sensed or detected during a ramp up period to determine the velocity of the object. In some embodiments, the processor determines the velocity of the object by calculating a phase shift between the adjacent portions of the first object signal.

In some embodiments, the processor determines the velocity of the object by determining a phase shift between the first object signal and a second object signal that corresponds to the object sensed or detected at a different time (e.g., during a ramp up period of a different frame). In some embodiments, the processor determines the velocity of the object by determining a Doppler shift between the first object signal between the first object signal and another object signal that corresponds to the object sensed during a ramp down period. In some embodiments, the processor may determine the velocity by calculating a first beat signal for the first object signal and a second beat signal for the second object signal. The processor may further determine a range or distance of the object based on the first and second beat signals.

In some embodiments, the processor is further configured to determine a velocity vector of the object relative to the LIDAR system using determinations of velocity and position from multiple frames. In some embodiments, the processor is further configured to track or trace the object over time and multiple frames. In some embodiments, the processor is further configured to predict the location of the object in subsequent frames based on the determined velocity or velocity vector. In some embodiments, the processor is further configured to generate a filter from the predicted location of the object. In some embodiments, the filter allows for noise to be reduced in signals received that correspond to subsequent frames. In some embodiments, the processor is further configured to determine an absolute velocity vector of the object relative to an environment external to the LIDAR system using a known, accessed, received, or determined velocity of the LIDAR system. In some embodiments, the processor is further configured to receive acceleration information regarding the LIDAR system and to adjust the predictions or trace the object with a world-centric perspective.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions.

Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may of course vary.

It is also to be understood that the terminology used herein is for the purpose of describing particular embodiments only, and is not intended to be limiting. It is also to be understood by one skilled in the art that "based on" should be construed as "based at least on" unless explicitly stated otherwise.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety.

Definitions that are contained in text incorporated by reference are excluded to the extent that they contradict definitions in this disclosure.

Other embodiments are set forth in the following claims.

What is claimed is:

1. A light detecting and ranging (LIDAR) system, the system comprising:
   a light source configured to generate a beam having discrete frequencies at different times;
   a wavelength dispersive element positioned to receive at least a portion of the beam and configured to sweep the beam over a range of angles in a field of view (FOV), wherein each discrete frequency of the beam corresponds to a different angle in the FOV;
   a detector positioned to receive portions of the beam that are reflected from an object within the FOV and configured to generate an object signal based on the received portions of the beam; and
   a processor communicably coupled to the detector, the processor configured to:
      cause the beam to sweep from a first frequency at a first time to a second frequency over a ramp up time period;
      cause the beam to sweep from the second frequency back to the first frequency over a ramp down time period; and
      determine a velocity of the object based on characteristics of the beam, wherein determining the velocity comprises identifying a first portion of the object signal that corresponds to the object detected during the ramp up time period and identifying a second portion of the object signal that corresponds to the object detected during the ramp down time period.

2. The system of claim 1, wherein to determine the velocity of the object, the processor is further configured to:
   calculate a first beat frequency for the first portion of the object signal; and
   calculate a second beat frequency for the second portion of the object signal.

3. The system of claim 2, wherein the first beat frequency is calculated using the first portion of the object signal and a first portion of the generated beam that corresponds to the first object signal, and the second beat frequency is calculated using the second portion of the object signal and a second portion of the generated beam corresponding to the second object signal.

4. The system of claim 2, wherein the processor is further configured to determine a distance of the object from the LIDAR system using the first beat frequency and the second beat frequency.

5. The system of claim 1, further comprising:
   an interferometer; and
   a beam splitting device positioned between the light source and the wavelength dispersive element, the beam splitting device configured to receive the beam generated by the light source and split the beam into an object beam that is directed toward the wavelength dispersive element and a reference beam that is directed toward the interferometer;
   wherein the interferometer is configured to detect frequencies of the reference beam.

6. The system of claim 1, wherein the ramp up time period and the ramp down time period correspond to a first frame, wherein the processor is further configured to cause the beam to sweep from the first frequency at a second time to the second frequency over a second ramp up time period and cause the beam to sweep from the second frequency back to the first frequency over a second ramp down time period, and wherein the second time, the second ramp up time period, and the second ramp down time period correspond to a second frame.

7. The system of claim 6, the processor further configured to:
   determine a first distance and a first angle of the object relative to LIDAR system during the first frame;
   determine a second distance and a second angle of the object relative to the LIDAR system during the second frame; and
   determine a velocity vector of the object relative to the LIDAR system using the first distance, the second distance, the first angle, and the second angle.

8. The system of claim 6, wherein to determine the second distance of the object, the processor is further configured to:
   predict the second distance of the object relative to the LIDAR system using the first distance and the velocity of the object;

generate a filter based on the predicted second distance; and filter received signals from the object in the second frame using the filter.

9. The system of claim 6, the processor further configured to determine a velocity vector of the object relative to an environment external to the LIDAR system using the velocity vector of the object relative to the LIDAR system and a velocity vector of the LIDAR system relative to the environment external to the LIDAR system.

10. A system, comprising:
a light source configured to generate a beam having discrete frequencies at different times;
a wavelength dispersive element positioned to receive at least a portion of the beam and configured to sweep the beam over a range of angles in a field of view (FOV), wherein each discrete frequency of the beam corresponds to a different angle in the FOV;
a detector positioned to receive portions of the beam that are reflected from an object within the FOV and configured to generate an object signal based on the received portions of the beam; and
a processor communicably coupled to the detector configured to:
cause the beam to sweep from a first frequency at a first time to a second frequency over a time period; and
determine a velocity of the object based on the portions of the beam received by the detector, wherein determining the velocity comprises determining a phase of a first portion of the object signal and determining a phase of a second portion of the object signal.

11. The system of claim 10, wherein the phase of the first portion is determined by performing a fast Fourier transform (FFT) on the first portion of the object signal and the phase of the second portion is determined by performing a FFT on the second portion of the object signal.

12. The system of claim 11, the processor further configured to determine a distance of the object from system, wherein the distance is determined based on the amplitude of the FFT of the first portion of the object signal and the amplitude of the FFT of the second portion of the object signal.

13. The system of claim 10, wherein to determine the velocity, the processor is further configured to:
determine a time difference between the first portion and the second portion;
estimate a wavelength of the beam; and
determine the velocity using the phase of the first portion, the phase of the second portion, the time difference, and the wavelength.

14. The system of claim 10, wherein the time period corresponds to a first frame, and wherein the processor is further configured to cause the beam to sweep from the first frequency at a second time to the second frequency continuously over a second time period, wherein the second time period corresponds to a second frame, and wherein to determine the velocity, the processor is further configured to:
determine a phase of a first object signal that corresponds to the object in the first frame;
determine a phase of a second object signal that corresponds to the object in the second frame; and
determine the velocity using the phase of the first portion, the phase of the second portion, and a wavelength corresponding to the first object signal.

15. A method of determining a velocity of an object within a field of view (FOV) of a sensing system, the method comprising:
controlling, via a processor, a light source to project a beam that is swept from a first frequency to a last frequency starting at a first time over a first time period;
projecting the beam toward a wavelength dispersive element;
directing the beam into the FOV at angles depending on frequency;
directing portions of the beam reflected from an object in the FOV to a detector;
generating an object signal based on received portions of the beam from the object in the FOV; and
determining, via the processor, a velocity of the object based on the object signal, wherein determining the velocity comprises identifying a portion of the object signal that corresponds to the object detected during the first time period.

16. The method of claim 15, wherein the velocity of the object is determined using a phase of a first portion of the object signal and a phase of a second portion of the object signal.

17. The method of claim 16, further comprising:
controlling, via the processor, the light source to project a beam that is swept continuously from the first frequency to the last frequency at a second time during a second time period, wherein the second time is after the first time period;
wherein determining the velocity of the object is based on an object signal corresponding to the object detected during the first time period and an object signal corresponding to the object detected during the second time period.

18. The method of claim 15, further comprising:
controlling, via the processor, the light source to sweep continuously the beam from the last frequency back to the first frequency after the first time period over a second time period; and
wherein determining the velocity of the object is based on an object signal corresponding to the object detected during the first time period and an object signal corresponding to the object detected during the second time period.

* * * * *